(12) United States Patent
Hori et al.

(10) Patent No.: US 6,198,593 B1
(45) Date of Patent: *Mar. 6, 2001

(54) HIGH PRECISION CARTRIDGE TRANSFERRING ROBOT FOR LIBRARY APPARATUS

(75) Inventors: Daisuke Hori; Hiroshi Shibuya; Chikatsu Kato; Nobuhiko Motoyama; Keiichi Saito, all of Kawasaki (JP)

(73) Assignee: Fujitsu, Ltd., Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,928

(22) Filed: Dec. 31, 1997

(30) Foreign Application Priority Data

Jul. 2, 1997 (JP) .................................................. 9-177036

(51) Int. Cl.[7] ...................................................... G11B 15/68
(52) U.S. Cl. ............................................... 360/92; 369/36
(58) Field of Search ............................... 369/34, 36, 178; 360/92

(56) References Cited

U.S. PATENT DOCUMENTS 4,701,899 * 10/1987 Costemor D'arc .................. 360/36
5,513,156 * 4/1996 Hanaoka et al. .................... 369/34
5,703,843 * 12/1997 Katsuyama et al. ................. 369/34

* cited by examiner

Primary Examiner—David Davis
(74) Attorney, Agent, or Firm—Greer, Burns & Crain, Ltd.

(57) ABSTRACT

A cartridge transferring robot for use in a library apparatus which is capable of improving the accuracy of the cartridge inserting/extracting angle of a hand mechanism and further of ensuring the positional accuracy of the tip portion of the hand mechanism sufficient for direct insertion and extraction of a cartridge into/from a drive unit. In the present invention, for these purposes, a tilt mechanism for adjusting the angle of the cartridge inserting/extracting direction with respect to a horizontal plane is composed of a tilt base for supporting a picker section so that the picker section is swingable around a supporting shaft located on a picker section front surface side facing a place for insertion or extraction of the cartridge, and a swinging drive mechanism disposed on the rear side of the picker section for making the picker section swing around the supporting shaft with respect to the tilt base. Further, this invention is for transferring cartridges among a storage unit, a cartridge entry/exit station and a drive unit within a library apparatus storing a large number of cartridges such as magnetic tape cartridges and optical disk cartridges.

12 Claims, 17 Drawing Sheets

US 6,198,593 B1

HIGH PRECISION CARTRIDGE TRANSFERRING ROBOT FOR LIBRARY APPARATUS

BACKGROUND OF THE INVENTION

1) Field of the Invention

The present invention relates to a cartridge transferring robot for use in a library apparatus which stores a large number of cartridges such as magnetic tape cartridges and optical disk cartridges, with the cartridge transferring robot taking the charge of the conveyance of the cartridges among a storage unit (or rack), a cartridge entry/exit station and a drive unit within the library apparatus.

2) Description of the Related Art

In general, a library apparatus functions as a large-capacity external storage unit, and a storage unit in its locker stores several thousands of cartridges each accommodating, for example, a magnetic tape as a storage medium, and access such as write/read of recording/recorded data is automatically done toward the storage medium within each of the cartridges.

Furthermore, in addition to the aforesaid storage unit for storing the cartridges, the library apparatus is equipped with a station [for example, a CAS (Cartridge Access Station), a DEE (Direct Entry/Exit), and an FES (Forced Exit Station)] for carrying out the entry of the cartridges from the external into the apparatus or vice versa, a plurality of magnetic tape drive units (which will be referred hereinafter to as MTUs) for conducting access such as write/read of recording/ recorded data toward a storage medium (magnetic tape) within a cartridge, and a cartridge transferring robot [automatic transferring robot; which will be referred hereinafter to as an accessor (ACC)] for performing the conveyance among the storage unit, the cartridge entry/exit station and the MTU.

In the case of such a library apparatus, on receiving an access demand to one cartridge from a host unit or the like, the accessor moves to the storage unit to search the directing cartridge and then transfers that cartridge up to the MTU in a state of gripping or holding it through the use of a hand mechanism, thereby putting it in the MTU. Whereupon, the MTU processes the storage medium (magnetic tape) within the cartridge. The cartridge discharged from the MTU after the completion of the processing is regripped by the hand mechanism of the accessor and transferred up to the storage unit by that accessor to be stored in a given location.

The accessor to be employed for the foregoing library apparatus is composed of a picker section including a hand mechanism for inserting and pulling out a cartridge in a state of gripping it, a moving mechanism for shifting this picker section to a given position, and a tilt mechanism (see FIG. 23) for adjusting an angle to be made with respect to a horizontal direction at the insertion and extraction (pulling-out) of the cartridge.

Thus, while transferring the cartridge, that cartridge is conveyed by the moving mechanism to the given position in a state of being gripped by the hand mechanism and taken into the interior of the picker section, and subsequently put in a unit (a cell of the storage unit or the MTU) at the given position. At this time, because of taking different insertion/ extraction angles of the cartridges for the respective units, there is a need to change the cartridge insertion/extraction angle taken by the hand mechanism.

As the cartridge inserting/extracting direction (angle) of the hand mechanism 112, for example there are taken a horizontal direction (0°) and a direction looking (inclined) downward by a given angle with respect to the horizontal direction. In the case of the MTU, in general the cartridges are inserted and pulled out in/from the horizontal direction (0°). On the other hand, in the case of the storage unit or the like, the cartridges are set in a condition looking downward (for example, 12°) relative to the horizontal direction to prevent them from dropping from the cells of the storage unit due to the vibrations caused by earthquakes and others, and therefore, the insertion and extraction of the cartridges are made at that angle.

For these reasons, the accessor is provided with a tilt mechanism 100, for example, as shown in FIG. 23. This tilt mechanism 100 comprises a tilt base (not shown) for supporting a picker section 110 so that the picker section 110 is swingable about or around a supporting shaft (spindle) 111 protrusively stood at a side surface of a substantially central portion of the picker section 110 in the forward and backward directions (in the left- and right-hand directions in FIG. 23), and a swinging drive mechanism 120 for making the picker section 110 rock around the supporting shaft 111 with respect to this tilt base.

The picker section 110 incorporates a hand mechanism 112 which is movable in the forward and backward directions and made to insert and draw a cartridge while gripping it, and as mentioned before, the cartridge held by the hand mechanism 112 is introduced into the picker section 110 at the cartridge conveyance. In FIG. 23, a mechanism for moving the hand mechanism 112 in the forward and backward directions is omitted from the illustration.

Furthermore, the swinging drive mechanism 120 is made up of a cam follower 121 protrusively set upright on its side surface on the front side of the picker section 110 which is in opposed relation to the cartridge inserted and extracted unit (storage unit, cartridge entry/exit station, MTU, and others), a plate cam 122 fitted to be movable in the cartridge inserting/extracting (drawing) direction with respect to the tilt base for guiding the cam follower 121 in the vertical directions in accordance with its movements in the forward and backward directions, and a drive mechanism (not shown) for moving the plate cam 122 in the cartridge inserting/extracting direction with respect to the tilt base.

The plate cam 122 has an elongated guide hole 122a made to extend in the forward and backward directions, and a pair of guide rollers 123, 123 installed on the tilt base side are fitted in this elongated guide hole 122a. Further, a pair of guide rollers 124, 124 set on the tilt base side in the forward and backward directions are placed into contact with a horizontal lower edge portion 122c of the plate cam 122 from the below. Whereupon, the plate cam 122 is set up on the tilt base to be movable in the cartridge inserting/ extracting direction while being guided by the guide rollers 123, 124.

In addition, the plate cam 122 incorporates a rack 122d which gears with a pinion (not shown) fitted over a drive shaft of a tilt motor (not shown). Accordingly, when the pinion is rotationally driven by the tilt motor, this rotational movement is converted into a linear movement of the plate cam 122 through the rack 122d gearing with this pinion, so that the plate cam 122 is driven in the cartridge inserting/ extracting direction. That is, the tilt motor, the pinion and the rack 122d constitute the aforesaid drive mechanism.

Moreover, the plate cam 122 has an elongated rocking drive hole 122b engaging with the cam follower 121. This elongated rocking drive hole 122b includes two horizontal portions 122b-1, 122b-3 different in height from each other and an inclined portion 122b-2 making the connection between these horizontal portions 122b-1, 122b-3.

The front side horizontal portion 122b-1 serves as a portion for maintaining the picker section 110 in the horizontal condition. As shown in FIG. 23, in a state where the cam follower 121 is located at the horizontal portion 122b-1 of the elongated hole 122b, the picker section 110 takes the horizontal condition, and the cartridge inserting/extracting direction depending upon the hand mechanism 112 are maintained to assume the horizontal directions.

On the other hand, the rear side horizontal portion 122b-3 is at position lower than the front side horizontal portion 122b-1, and serves as a portion for maintaining the picker section 110 in the tilt condition in which the front surface of the picker section 110 is directed downwardly by a given angle (for example, 12°) from the horizontal direction. If the plate cam 122 is shifted forwardly (in the left-hand direction in FIG. 23) from the state of FIG. 23 and the cam follower 121 is guided and shifted from the horizontal portion 122b-1 through the inclined portion 122b-2 to the horizontal portion 122b-3, the picker section 110 comes into the tilt condition, and the cartridge inserting/extracting direction of the hand mechanism 112 is maintained to be inclined downwardly by a given angle (for example, 12°) from the horizontal direction.

In the prior library apparatus, each of the MTUs is equipped with a dedicated cartridge giving and receiving mechanism, and the accessor takes the charge of only handing over the cartridge to the cartridge giving and receiving mechanism, whereas the cartridge giving and receiving mechanism accomplishes the actual insertion of the cartridge into the MTU. In addition, the cartridge taken out from the MTU is handed over through the cartridge giving and receiving mechanism to the accessor. Accordingly, in the prior art, the positional accuracy of the tip portion of the hand mechanism needs not be relatively high.

However, recently, for the purpose of the size reduction and low manufacturing cost of the library apparatus, it is desirable that the cartridge giving and receiving mechanism is omitted so that the accessor directly conducts the insertion and extraction of the cartridge into/from the MTU. This requires the considerable improvement of the positional accuracy of the tip portion of the hand mechanism being in the advanced condition.

In the prior tilt mechanism 100 shown in FIG. 23, the supporting point (i.e., the position of the supporting shaft 111) on the tilt action stands at the center of picker section 110 in the forward and backward directions, while the effort point (i.e., the position of the cam follower 121) is on the front side of the picker section 110. Thus, in the prior tilt mechanism 100, the distance $L_1$ from the supporting point to the effort point is set to be short, thereby changing the attitude of the picker section 110, i.e., the cartridge inserting/extracting direction of the hand mechanism 112, without moving the picker section 110 in a large way. Accordingly, the moving quantity of the picker section 110 in the height directions is reduced to cope with the restriction in the mounting space around the picker section 110. This signifies that no consideration is paid to the positional accuracy of the tip portion of the hand mechanism 112 being in the advanced condition.

That is, in the case of the prior tilt mechanism 100 shown in FIG. 23, the distance $L_2$ from the supporting point to the tip position of the hand mechanism 112 is set to be considerably longer than the distance $L_1$ from the supporting point to the effort point, and therefore, the dimensional error dy at the effort point results in being enlarged and amplified to $L_2/L_1$ (>1) times at the tip position of the hand mechanism 112. For this reason, the positional accuracy at the tip portion of the hand mechanism deteriorates, so that difficulty is encountered to ensure the positional accuracy whereby the accessor can directly accomplish the insertion and extraction of the cartridge into/from the MTU.

SUMMARY OF THE INVENTION

The present invention has been developed with a view to eliminating these problems, and it is therefore an object of the present invention to provide a cartridge transferring robot for a library apparatus which is capable of enhancing the angular accuracy for the insertion and extraction of a cartridge depending upon a hand mechanism with a simple structure to ensure the positional accuracy of the tip portion of the hand mechanism, which allows the direct insertion and extraction of the cartridge into/from a drive unit.

For this purpose, in accordance with the present invention, in a library apparatus including at least a storage unit for storing cartridges each accommodating a storage medium, a cartridge entry/exit station for the entry/exit of the cartridge, and a drive unit for carrying out access to the storage medium within the cartridge, a cartridge transferring robot for use in the library apparatus is composed of a picker section having a hand mechanism for gripping the cartridge for insertion and extraction of the cartridge at cartridge conveyance within the library apparatus, a moving mechanism for moving the picker section up to a given position, and a tilt mechanism for adjusting an angle of a cartridge inserting/extracting direction with respect to a horizontal plane, and the tilt mechanism is made up of a tilt base for supporting the picker section so that the picker section is swingable around a supporting shaft placed on a front surface side of the picker section being in opposed relation to a cartridge inserted and extracted unit, and a swinging drive mechanism disposed on a rear side of the picker section for making the picker section rock around the supporting shaft with respect to the tilt base.

In this cartridge transferring robot for a library apparatus according to this invention, through the swinging drive mechanism located on the rear side of the picker section, the picker section is swingingly driven about the supporting shaft placed on the front surface side of the picker section to adjust the angle of the cartridge inserting/extracting direction with respect to the horizontal plane. That is, since the supporting point (i.e., the position of the supporting shaft) on the tilt action is set on the front side of the picker section while the effort point (the driven position by the swinging drive mechanism) is placed on the rear side of the picker section, the distance from the supporting point to the effort point can be set to assume a sufficiently larger value as compared with the distance from the supporting point to the tip position of the hand mechanism.

This swinging drive mechanism can employ the following constructions (1) to (4).

(1) A swinging drive mechanism comprises a cam follower provided on a rear side surface of a picker section, a plate cam set to be movable in the cartridge inserting/extracting direction with respect to a tilt base for guiding the cam follower in the vertical directions in accordance with its movement in the forward and backward directions, and a drive mechanism for moving the plate cam in the cartridge inserting/extracting direction with respect to the tilt base. According to this swinging drive mechanism, the plate cam is drive by the drive mechanism in the cartridge inserting/extracting direction (in the forward/backward directions) so that the cam follower is guided vertically in accordance with the forward and backward movements of the plate cam and the picker section is swingingly driven with respect to the tilt base, thereby adjusting the angle of the cartridge inserting/extracting direction with respect to a horizontal plane.

(2) A swinging drive mechanism comprises a cam follower set on a rear surface of a picker section, a block cam set to be movable in directions perpendicular to the cartridge inserting/extracting direction with respect to a tilt base for guiding the cam follower in the vertical directions in accordance with its movement, and a drive mechanism for moving the block cam in directions perpendicular to the cartridge inserting/extracting direction with respect to the tilt base. According to this swinging drive mechanism, through the drive mechanism, the block cam is driven in the directions (the left- and right-hand directions) perpendicular to the cartridge inserting/extracting direction, and the cam follower is guided vertically in accordance with the right- and left-hand directions of the block cam so that the picker section is swingingly driven with respect to the tilt base, thus adjusting the angle of the cartridge inserting/extracting direction with respect to the horizontal plane.

(3) A swinging drive mechanism is composed of a cam follower placed on a rear side of a picker section, a cylindrical cam fitted to be rotatable around its vertical axis with respect to a tilt base for guiding the cam follower in the vertical directions in accordance with its rotational movement, and a rotating drive mechanism for rotating the cylindrical cam around the vertical axis with respect to the tilt base. According to this swinging drive mechanism, through the rotating drive mechanism, the cylindrical cam is rotationally driven to vertically guide the cam follower in accordance with the rotational movement of the cylindrical cam so that the picker section is swingingly driven with respect to the tilt base, thus adjusting the angle of the cartridge inserting/extracting direction with respect to the horizontal plane.

(4) A swinging drive mechanism is made up of a cam follower fitted on a rear side surface of a picker section, a guide member fixedly secured to a tilt base for guiding the cam follower around a supporting shaft, a link mechanism whose tip side is pivotally attached to the cam follower and whose proximal side is pivotally fitted to the tilt base, and a rotating drive mechanism for rotating the proximal side of the link mechanism around its pivotal shaft. According to this swinging drive mechanism, through the rotating drive mechanism, the proximal side of the link mechanism is rotationally driven around the pivotal shaft, and the cam follower is driven along the guide member through the link mechanism so that the picker section is swingingly driven with respect to the tilt base, thus adjusting the angle of the cartridge inserting/extracting direction with respect to the horizontal plane.

Thus, in the cartridge transferring robot for a library apparatus according to this invention, the supporting point (i.e., the position of the supporting shaft) for the tilt operation is set on the front side of the picker section while the effort point (i.e., the driving position by the swinging drive mechanism) is located on the rear side of the picker section, with the result that the distance from the supporting point to the effort point can be set to be sufficiently longer than the distance from the supporting point to the tip position of the hand mechanism.

Accordingly, only by changing the positional relationship between the supporting point and effort point for the tilt operation, the accuracy of the cartridge inserting and extracting angle of the hand mechanism is sharply improvable with an extremely simple construction and the positional accuracy of the tip portion of the hand mechanism is attainable to satisfactorily permit the direct insertion and extraction of the cartridge for the drive unit. Consequently, without each drive unit being equipped with the cartridge giving and receiving mechanism, the direct insertion and extraction of the cartridge into/from each of the drive units becomes feasible by the hand mechanism, thus greatly contributing to the size reduction and lower manufacturing cost of the library apparatus.

BRIEF DESCRIPTION OF THE DRAWINGS

FIG. 1A shows a horizontally disposed condition of a picker section while FIG. 1B illustrates a tilt condition of the picker section;

FIG. 22A shows a horizontally disposed condition of a picker section while FIG. 22B illustrates a tilt condition of the picker section.

DESCRIPTION OF THE PREFERRED EMBODIMENTS

Embodiments of the present invention will be described hereinbelow with reference to the drawings.

[1] Description of Entire Arrangement of Library Apparatus

Figure 2:
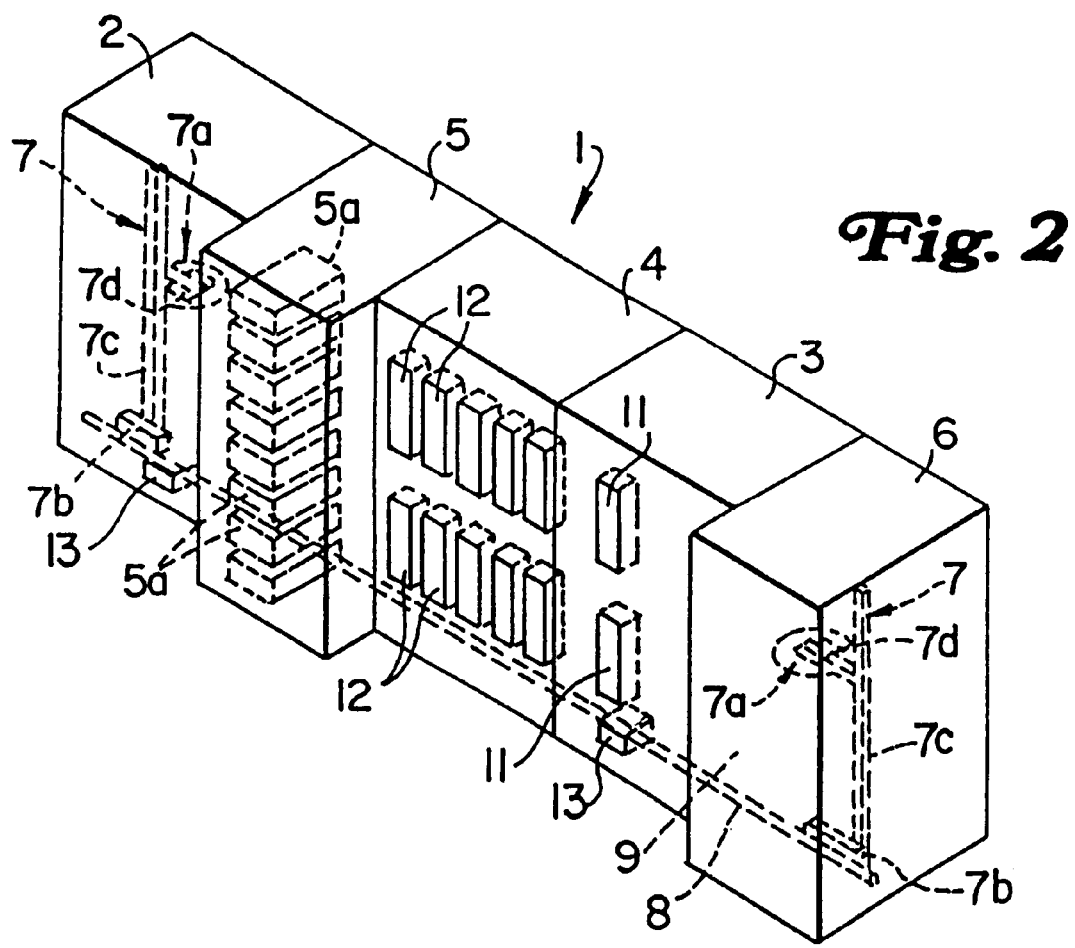
FIG. 2 is a perspective view illustratively showing the whole structure of a library apparatus to which embodiments of this invention are applicable.

FIG. 2 is a perspective view illustratively showing the entire construction of a library apparatus to which embodiments of this invention are applicable. As shown in FIG. 2, a library apparatus 1 to which embodiments of this invention are applicable stores a large number of magnetic tape cartridges 10 (see FIGS. 9 and 10; cartridges each accommodating a magnetic tape as a storage medium) and conducts access such as write/read of recording/recorded data toward each of the magnetic tape cartridge 10.

The library apparatus 1 is composed of, for example, left and right accessor units (which will be referred hereinafter to as LAU, RAU, respectively) 2, 3, a cartridge storage unit (which will be referred hereinafter to as a CSU) 4, a tape drive mount unit (which will be referred hereinafter to as a TMU) 5, and an accessor extend unit (which will be referred hereinafter to as an AEU) 6, which are in a connected relation to each other. Also included in the apparatus 1 are cartridge transferring robots (automatic conveying robot; which will be referred hereinafter to as accessors) 7 which are located on the left and right sides, respectively, and which move within these units 2 to 6 to transfer the cartridge 10.

The LAU 2 and RAU 3 function as garages for the accessors 7, respectively, and on the front side of the RAU 3 (the external space side, that is, the side where the operator operates the apparatus) there are provided a pair of upper and lower cartridge entry/exit stations [each of which will be referred hereinafter to as a CAS (Cartridge Access Station)] 11, 11 for carrying out the entry or exit of the cartridge 10 into or from the library apparatus 1 and a cartridge forced exit station (FES) 13 for forcedly discharging a defective cartridge to the external. In addition, another FES 13 is placed on the front side of LAU 2.

The CSU 4 stores a large number of cartridges 10, and in the embodiments of this invention, five cartridge direct entry/exit stations (each of which will be referred hereinafter to as a DEE) 12 are set on the upper side and five DEEs 12 on the lower side, ten in total. In each of the DEEs 12, a magazine (not shown) storing a plurality of cartridges 10 is set in order to permit the simultaneous entry or exit of the plurality of cartridges 10 into or from the library apparatus 1.

Furthermore, a storage unit (not shown) having a large number of cells for storing a large number of cartridges 10 is placed on an inner wall surface of each of the LAU 2, RAU 3 and CSU 4, and the cartridge 10 from the CAS 11 or the DEE 12 is stored in a given cell of the storage unit through the use of the accessor 7.

The TMU 5 has a plurality of (6 in FIG. 2) magnetic tape drive units (drive units; which will be referred hereinafter to as MTUs) 5a, and each of the MTUs 5a conducts the write/read processing of recording/recorded data onto/from a magnetic tape within the cartridge 10 transferred by each of the accessors 7.

The AEU 6 includes a power source (not shown) for supply of an operating power to each of the accessors 7 and a controller (not shown) for control of the accessors 7.

These units 2 to 6 are in a coupled relation to each other and disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which penetrates the units 2 to 6, and placed on the bottom surface of this operating space 9 is a rail (X rail) 8 for guiding the respective accessors 7, which allows each of the accessors 7 to move within the operating space 9.

In addition to a hand mechanism 7d (see FIGS. 11 and 12) for holding the cartridge 10 to perform the insertion/extraction thereof, each of the accessors 7 involves a carriage 7b movable in the horizontal directions along the X rail 8 for moving a hand assembly 7a including this hand mechanism 7d up to a given position and a vertical column 7c for vertically guiding the hand assembly 7a on the carriage 7b, which constitute a moving mechanism. This invention relates to this accessor 7, and a structure and operation thereof will be described later with reference to FIGS. 1 and 3 to 22B.

In the library apparatus 1 thus constructed, the cartridge 10 from the CAS 11 or the DEE 12 is picked up and taken out by the hand mechanism 7d of the accessor 7 and is inserted into and stored in a given cell of the storage unit after being carried through the operating space 9 by the accessor 7.

Furthermore, of a large number of cartridges 10 stored in the respective cells of the storage unit, a cartridge(s) 10 specified by a host unit is gripped and pulled out by the hand mechanism 7d of the accessor 7 and then transferred by the accessor 7 through the operating space 9 to the MTU 5a of the TMU 5 to be inserted thereinto.

In the MTU 5a, after the recording/reproduction processing on/from the magnetic tape housed in the cartridge 10, the cartridge 10 staying within the MTU 5a is discharged therefrom and gripped and taken out by the hand mechanism 7d of the accessor 7 and subsequently inserted into and stored in a given cell of the storage unit by the accessor 7 after passing through the operating space 9.

Incidentally, for discharging the cartridge(s) 10 stored in the storage unit to the exterior of the library apparatus 1, the cartridge 10 to be discharged is gripped by the hand mechanism 7d of the accessor 7 to be taken out from the storage unit and then transferred through the operating space 9 to the CAS 11 or the DEE 12 by the accessor 7 to be inserted into a given position (cell) of the CAS 11 or the DEE 12.

[2] Description of Basic Arrangement of Accessor

Secondly, referring to FIGS. 3 to 12, a description will be made hereinbelow of a basic arrangement of each accessor 7 in the embodiments of this invention.

[2-1] Description of Entire Arrangement of Accessor

Figure 3:
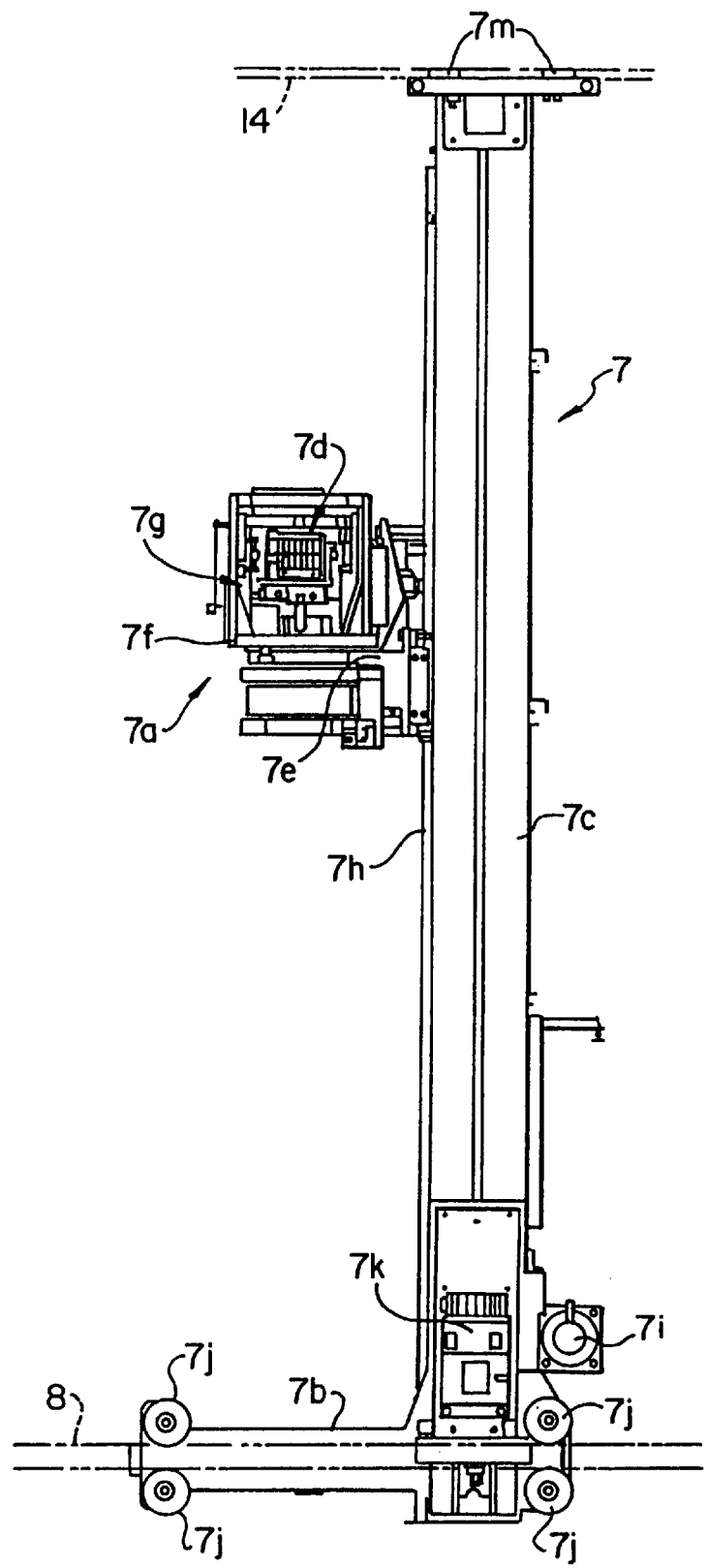
FIG. 3 is a front elevational view showing an accessor in the embodiments of this invention.

FIG. 3 is a front elevational view showing the accessor 7 in the embodiments of this invention. As shown in FIG. 3, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d through a tilt base 7f on a supporting base 7e. The detailed construction thereof will be described later.

The supporting base 7e making up the hand assembly 7a is attached to the vertical column 7c to be allowed to slide up and down while being guided by a guide rail 7h fixed vertically along the vertical column 7c. In addition, the supporting base 7e is coupled to a belt (not shown; a belt wound around a pair of pulleys built in upper and lower locations of the vertical column 7c). When this belt is rotationally driven by an elevating drive motor 7i, the supporting base 7e, that is, the whole hand assembly 7a, is vertically shifted to be positioned at a given height.

The carriage 7b is integrally connected to a lower end side of the vertical column 7c and is made to travel along the X rail 8 while supporting the vertical column 7c. Onto the front and rear sides of this carriage 7b, there are pivotally fitted two sets (two pairs) of traveling rollers 7j, 7j each set of which are situated to vertically sandwich the X rail 8 therebetween to be rotatable in accordance with the traveling of the carriage 7b.

Furthermore, the X rail 8 is equipped with a traveling drive rack (not shown) made to extend in its longitudinal directions. In addition, the carriage 7b is provided with a pinion (not shown) geared with that rack to be rotationally driven by a traveling drive motor 7k.

Still further, a top rail 14 is laid in an upper section of the operating space 9 of the accessor 7 to extend in parallel to the X rail 8. In addition, on the upper end side of the vertical column 7c, there are pivotally fitted two sets (two pairs) of guide rollers 7m, 7m which are situated on the front and rear sides to horizontally sandwich the top rail 14 therebetween to be rotatable in accordance with the traveling of the carriage 7b.

Thus, when the traveling drive motor 7k rotationally drives the pinion, the accessor 7 is wholly moved along the X rail 8 while the pinion and the traveling drive rack gear with each other. Further, when the elevating drive motor 7i revolves the aforesaid belt, the hand assembly 7a is wholly moved up and down along the vertical column 7c. Consequently, the hand assembly 7a (the picker section 7g including the hand mechanism 7d) is shifted up to a given position within a plane including the X rail 8 and the vertical column 7c and positioned thereat.

[2-2] Description of Hand Assembly

Figure 4:
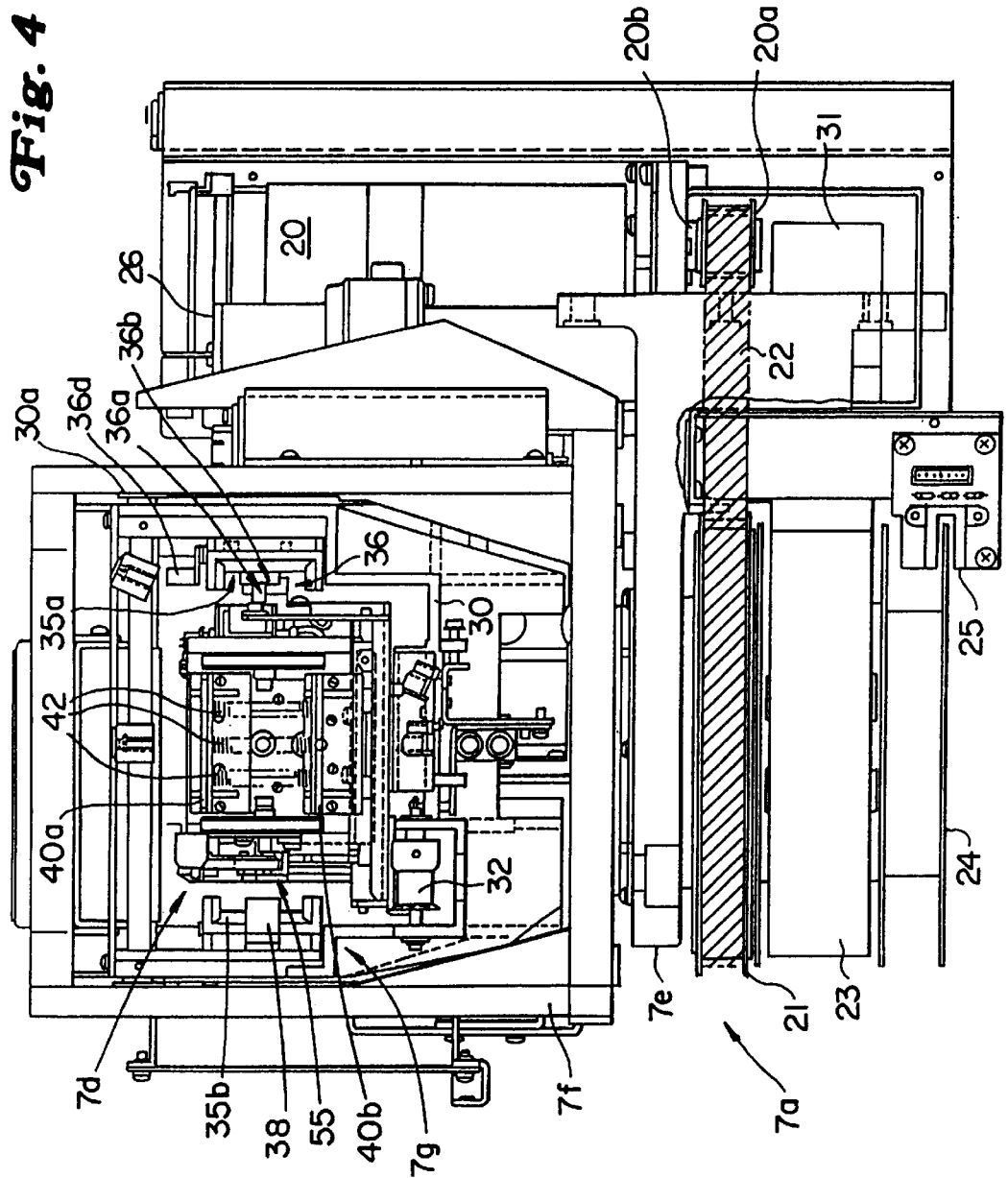
FIG. 4 is a front elevational view showing a hand assembly of the accessor in the embodiments of this invention.
Figure 5:
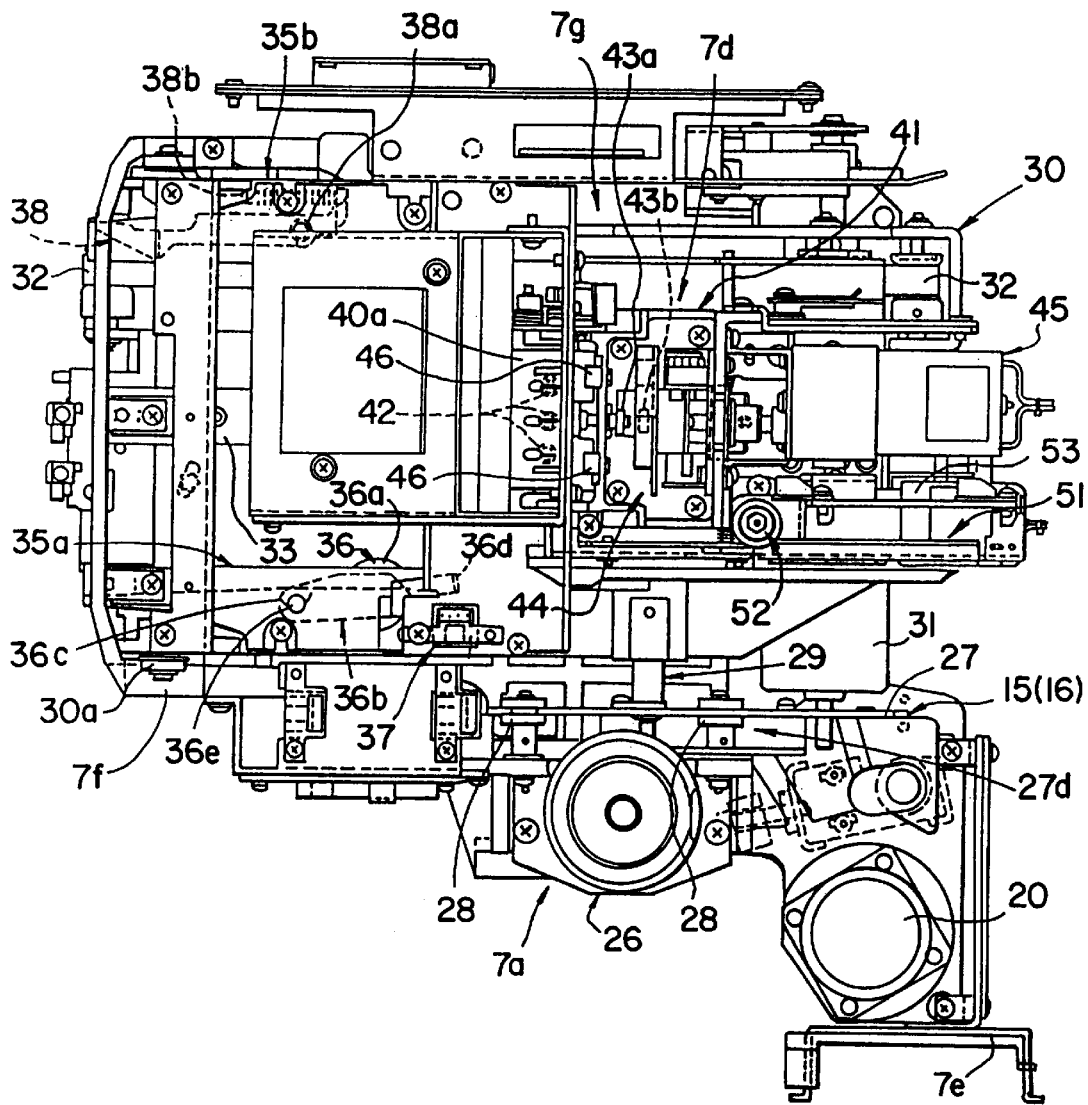
FIG. 5 is a plan view showing the hand assembly of the accessor in the embodiments of this invention.

FIGS. 4 and 5 are front elevational and plan views showing the hand assembly 7a of the accessor 7 in the embodiments of this invention. As shown in FIGS. 4 and 5, in that hand assembly 7a, the hand mechanism 7d is mounted on the picker section 7g (a picker base 30) to be movable in the forward and backward directions, and as will be described with reference to FIGS. 6 to 10, the hand mechanism 7d is driven by a servo motor 31 and a timing belt 32 to slide in the forward and backward directions (the left- and right-hand directions in FIG. 5) along an LM guide 33.

The picker section 7g (picker base 30) is swingably fitted to the tilt base 7f and is swingingly driven around a supporting shaft (rotary shaft) 30a through a swinging drive mechanism 16 comprising a tilt motor 26, a plate cam 27 and a guide roller 28 located on the supporting base 7e side and a cam follower 29 situated on the picker section 7g side. A tilt mechanism 15 comprising the aforesaid tilt base 7f and swinging drive mechanism 16 constitutes a feature of this invention, and the detailed description thereof will be taken later as a first embodiment of this invention with reference to FIGS. 1 and 13 to 16.

Furthermore, the tilt base 7f is fitted with respect to the supporting base 7e to be revolvable, and driven through a revolving drive motor 20, a pulleys 20a, 21 and a timing belt 22 to revolve around its vertical shaft.

More specifically, the revolving drive motor 20 is fixedly secured to the supporting base 7e side in a state where a driven shaft 20b is disposed vertically, and the pulley 20a fitted over the driven shaft 20b is rotationally driven around its vertical shaft. Further, the tilt base 7f is supported by the supporting base 7e to be revolvable around its vertical shaft, and the pulley 21 is fitted to the tilt base 7f to be coaxial with its revolving shaft. In addition, the timing belt 22 is wound around the pulleys 20a and 21.

Accordingly, in a manner that the revolving drive motor 20 rotationally drives the pulley 20a, the rotational drive force of the motor 20 is transmitted through the timing belt 22 and the pulley 21 to the tilt base 7f which in turn, is driven to be revolved around its vertical shaft together with the picker section 7g and the hand mechanism 7d.

Moreover, provided below the pulley 21 is a cable casing 23, and further fitted below it is a disc 24 with a slit for rotational position detection which rotates integrally with the pulley 21 and the tilt base 7f.

In the cable casing 23, a cable (not shown) for transmission and reception of various signals and a power supply between the supporting base 7e side and the tilt base 7f side is put spirally with respect to its revolving shaft to be revolvable therein.

The disc 24 with the slit is disposed to pass through the position of a photosensor 25 fixed on the supporting base 7e side, so that the photosensor 25 can detect the slit (not shown) of the disc 24, which allows the detection of the revolved position of the tilt base 7f, i.e., the direction of the picker section 7g (hand mechanism 7d).

As shown in FIGS. 4 and 5, in addition to the aforesaid picker base 30, servo motor 31, timing belt 32 and LM guide 33, the picker section 7g is equipped with a cartridge discrimination actuator 36 comprising a pair of left- and right-hand guide members 35a, 35b, a roller 36a, an arm 36b, a coil spring 36c, a flag 36d and a rotary shaft 36e, and further provided with a photosensor 37, and a claw (locking member) 38 swingable around a rotary shaft 38a and biased by a spring 38b. The detailed description of these portions will be made later with reference to FIGS. 6 to 10.

In addition, as shown in FIGS. 4 and 5, the hand mechanism 7d is provided with a mounter mechanism 50 comprising a pair of upper and lower hand members 40a, 40b, a hand base 41, springs 42, a pair of upper and lower cam followers 43a, 43b, a cam 44, a hand opening and closing drive motor (rotating drive mechanism) 45, linear ways 46, a mounter arm 51 with a rack 51a, a pinion 52 and a mounter arm drive motor 53, and further equipped with a CIP/CSP unit 55. These portions will be described later in detail with reference to FIGS. 11 and 12.

[2-3] Description of Picker Section

Figure 6:
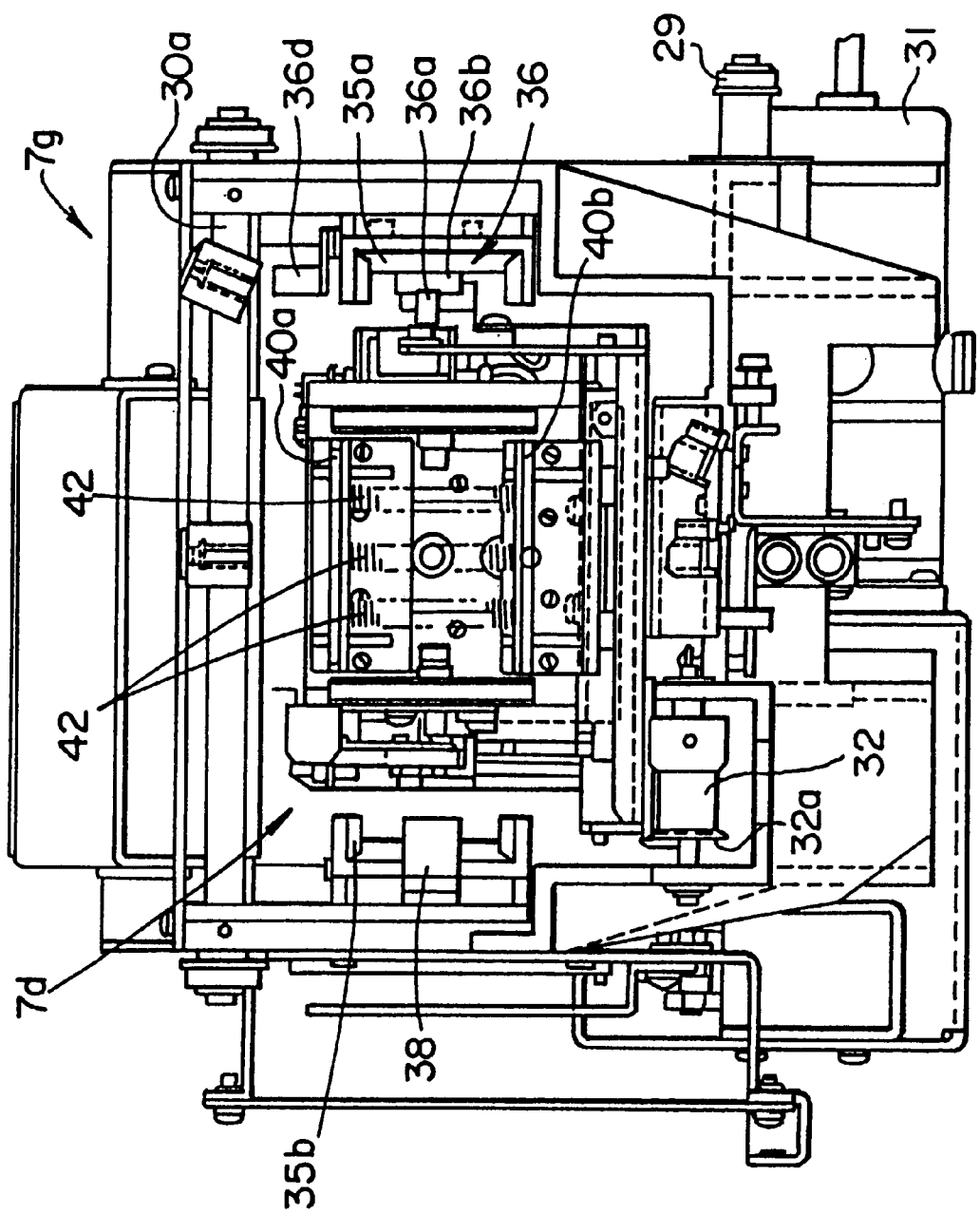
FIG. 6 is a front elevational view showing a picker section of the accessor in the embodiments of this invention.
Figure 7:
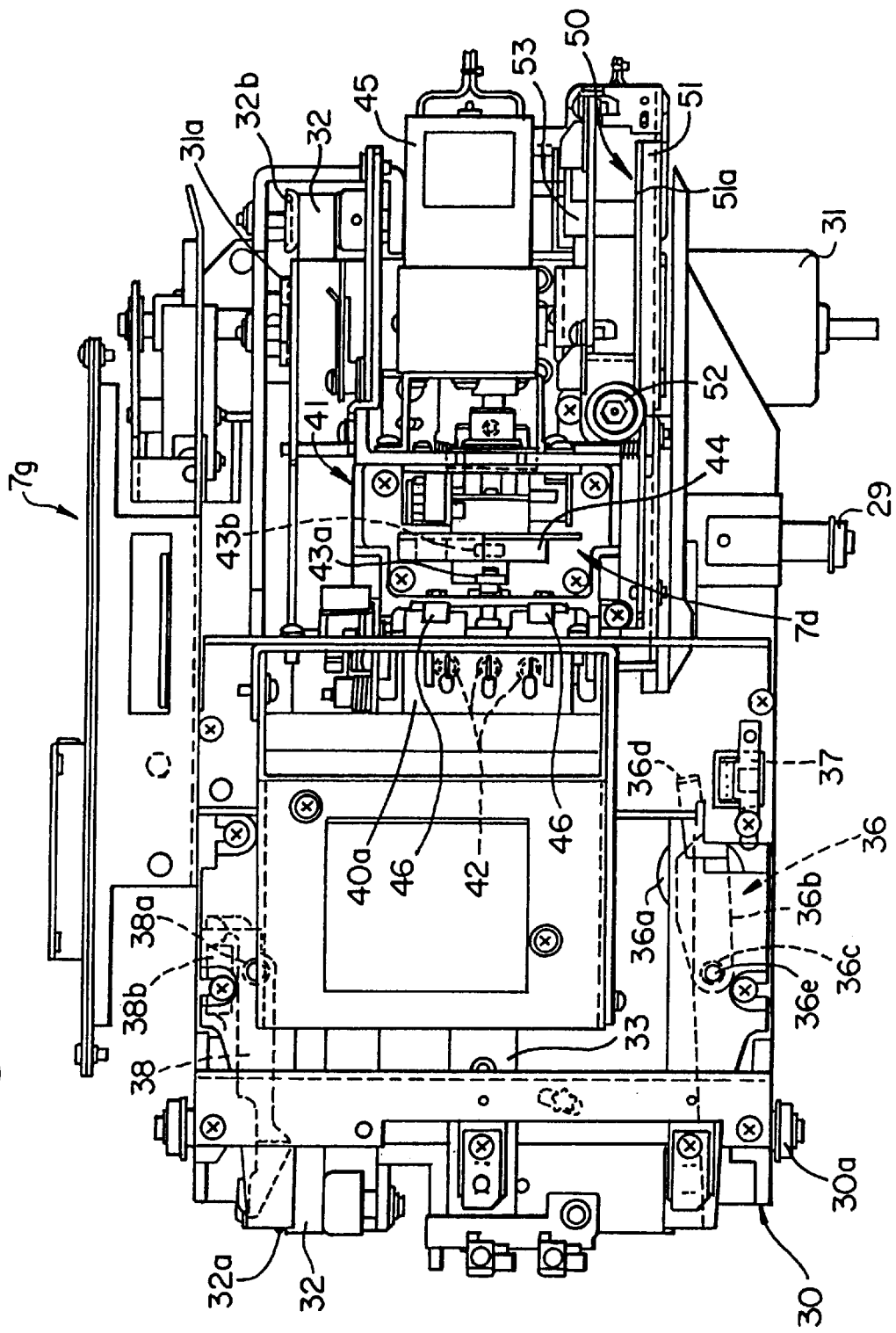
FIG. 7 is a plan view showing the picker section of the accessor in the embodiments of this invention.
Figure 8:
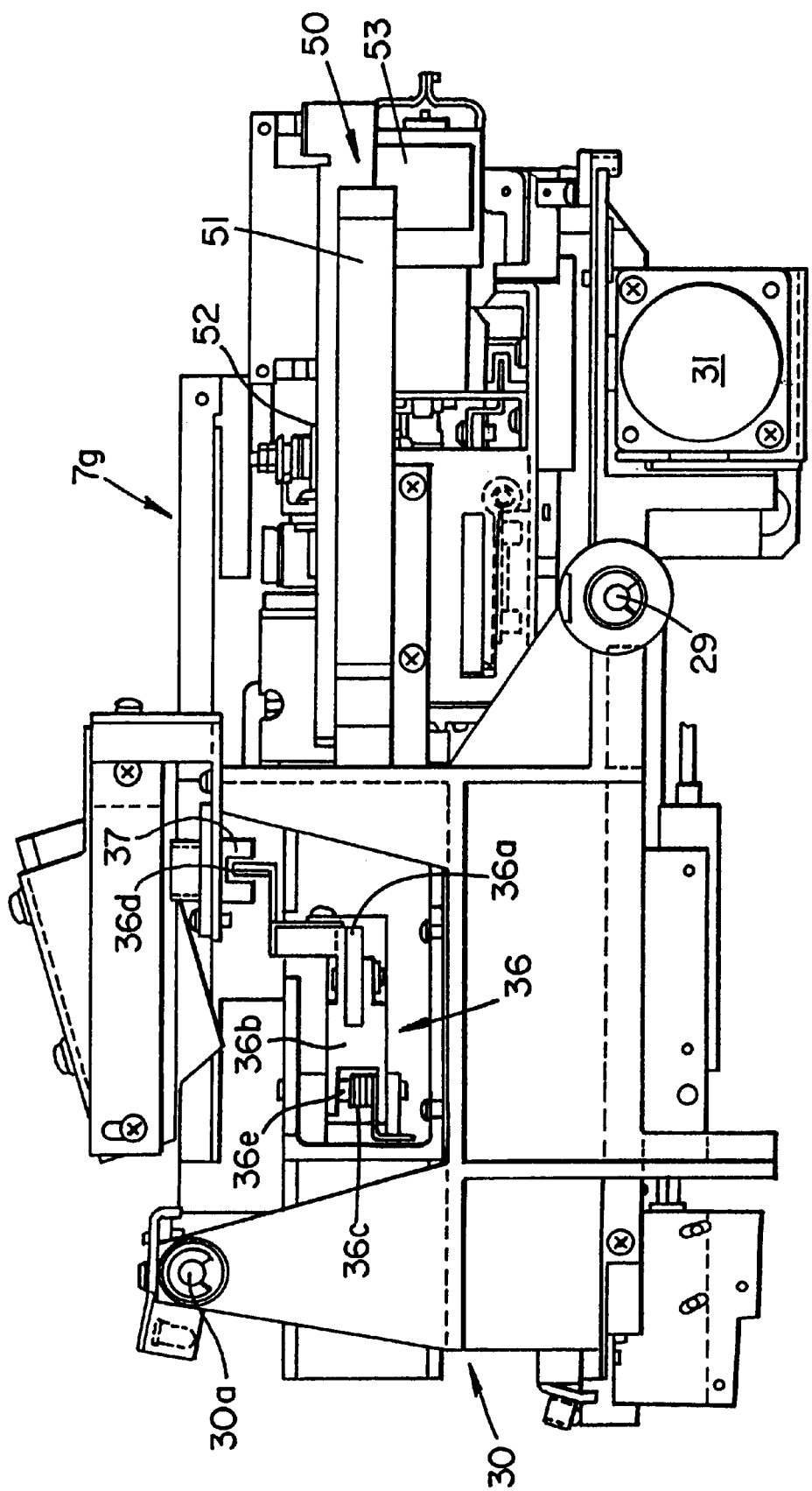
FIG. 8 is a side elevational view showing the picker section of the accessor in the embodiments of this invention.
Figure 9:
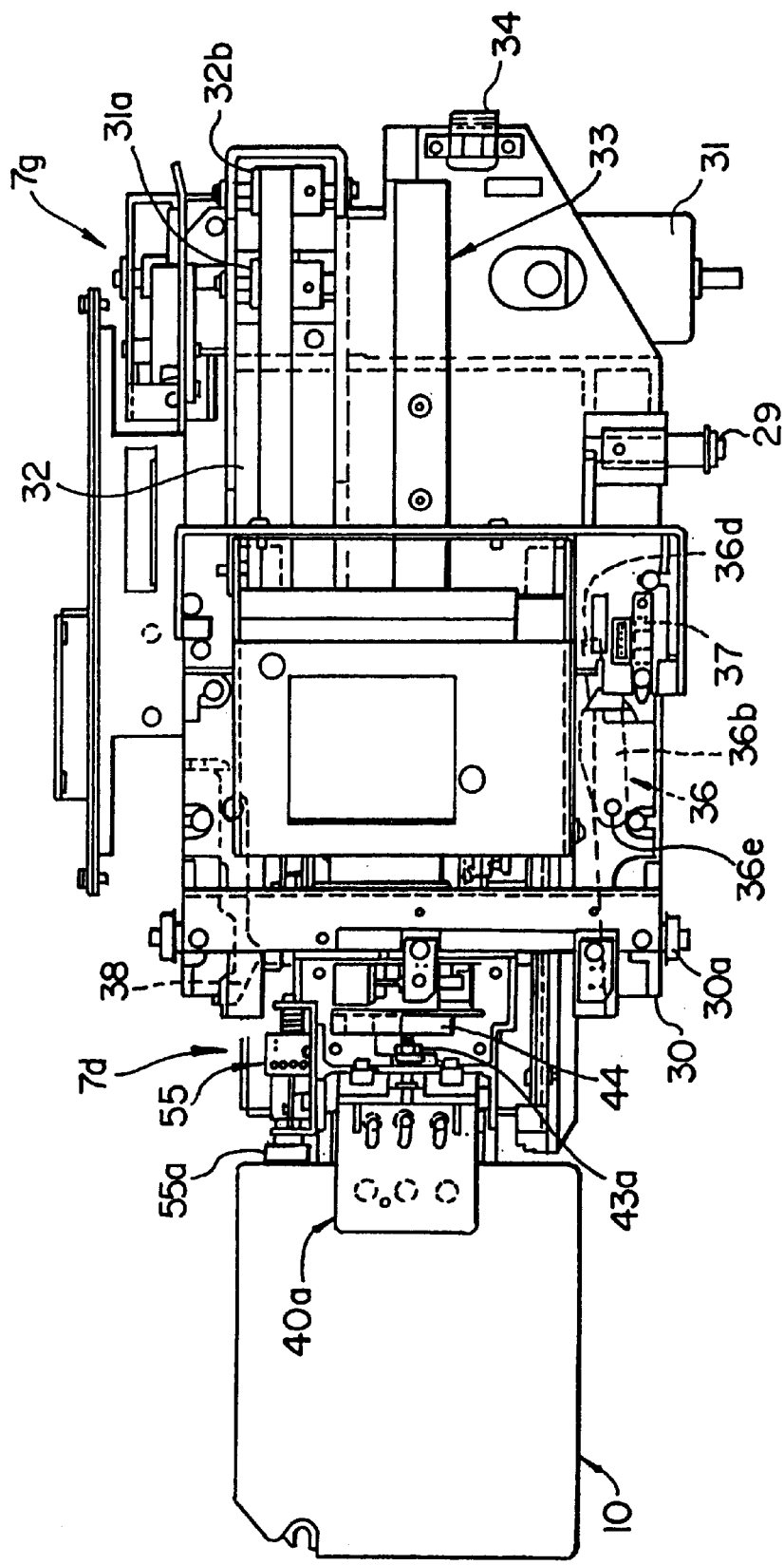
FIG. 9 is a plan view showing the advanced condition of a hand mechanism in the picker section of the accessor in the embodiments of this invention.
Figure 10:
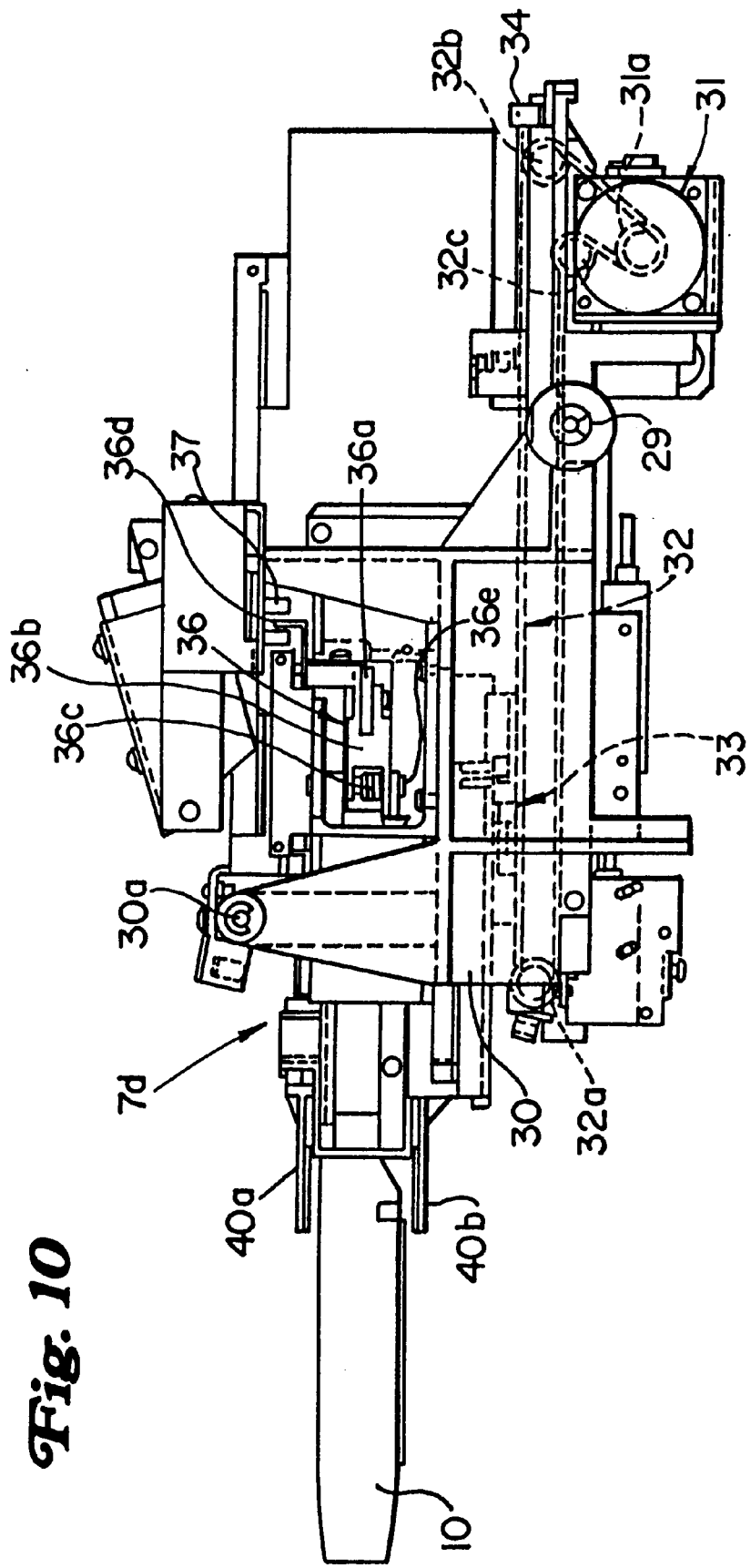
FIG. 10 is a side elevational view showing the advanced condition of the hand mechanism in the picker section of the accessor in the embodiments of this invention.

FIGS. 6 to 10 are illustrations of the picker section 7g of the accessor 7 in the embodiments of this invention, and of these drawings, FIG. 6 is a front elevational view of the picker section 7g, FIG. 7 is a plan view thereof, FIG. 8 is a side elevational view thereof, and FIGS. 9 and 10 are respectively plan and side elevational views showing the advanced condition of the hand mechanism 7d of the picker section 7g. In these illustrations, the reference numerals being the same as those in the above description represent the same or substantially same parts.

As shown in FIGS. 6 to 8, the hand mechanism 7d is mounted in the picker section 7g to be movable in the forward and backward directions, and is driven by the servo motor 31 and the timing belt 32 to slide in the forward and backward directions (left- and right-hand directions in FIG. 8) along the LM guide 33.

More specifically, the hand base 41 of the hand mechanism 7d is connected with the timing belt 32, and as shown in FIGS. 6, 7, 9 and 10, the timing belt 32 is wound around the pulleys 32a, 32b disposed on the front and rear sides of the picker base 30 and the pulley 31a connected to a drive shaft (not shown) of the servo motor 31, and guided with a guide roller 32c.

With this structure, when the timing belt 32 is revolved by the servo motor 31, the hand base 41, that is, the whole hand mechanism 7d, is moved in the backward or forward direction to take the retracted condition (retreated position) shown in FIGS. 6 to 8 or the cartridge 10 giving and receiving condition (advanced position) shown in FIGS. 9 and 10.

Incidentally, to the rear end portion of the picker base 30, there is fitted a picker home sensor (photosensor) 34 which detects that the hand mechanism 7d is retracted up to the home position (retreated position).

On the other hand, in the embodiments of this invention, for treating a plurality of types of cartridges 10 within the library apparatus 1, a type identifying mechanism is placed in the picker section 7g to identify or discriminate the type of the cartridge 10 held in the picker section 7g in a state of being gripped by the hand mechanism 7d, and as will be described later, the type identifying mechanism is made up of an actuator 36 and a photosensor 37.

In addition, the picker section 7g is provided with a pair of left- and right-hand guide members 35a, 35b for guiding the cartridge 10 to be led into the picker section 7g in a state of being gripped by the hand mechanism 7d while holding the same cartridge 10 from both sides. The separation between these paired guide members 35a, 35b is set to be slightly larger than the largest of the plurality of types of cartridges 10.

Furthermore, in the embodiments, the type identifying mechanism is composed of the aforesaid actuator 36 made to move in accordance with the irregularity (variation in height) of one side surface of the cartridge 10 held in the picker section 7g, the photosensor 37 serving as a detection section for detecting the quantity of movements of this actuator 36, and an identifying section (not shown; a control CPU for taking the charge of control of the operation of the accessor 7) for identifying the type of the cartridge 10 on the basis of the movement quantity of the actuator 36 detected by the photosensor 37.

In the embodiments, the actuator 36 is located on one guide member 35a side and is, as mentioned above, composed of the roller 36a, the arm 36b, the coil spring 36c, the flag 36d and the rotary shaft 36e.

In this case, the roller 36a is disposed to protrude from the guide member 35a toward the cartridge side, and is made to rotate around a shaft perpendicular to the traveling plane of the cartridge 10 while coming into contact with one side surface of the cartridge 10. The arm 36b pivotally supports the roller 36a, and is fitted to the picker section 7g to be swingable around the rotary shaft 36e normal to the traveling plane of the cartridge 10 to swing in accordance with the irregularity of one side surface of the cartridge 10. The coil spring 36c is for biasing the arm 36b to press the roller 36a against the one side surface of the cartridge 10. The flag 36d is made to project from the arm 36b, and shifts in accordance with the swinging action of the arm 36b.

Furthermore, the photosensor 37 undergoes the light-interception by this flag 36d depending upon the flag 36d movement, and the aforesaid identifying section identifies the type of the cartridge 10 on the basis of the information about the light-interception from the photosensor 37.

Incidentally, in the embodiments, a diagnostic function for diagnosing the dimensional accuracy of the accessor 7 is given in a manner that the accessor 7 is made to insert and extract a diagnostic cartridge (not shown) into/from a diagnostic cell (not shown) placed at a given position within the library apparatus 1, and the type identifying mechanism comprising the aforementioned actuator 36, photosensor 37 and identifying section is designed to identify as one of the plurality of types of cartridges the diagnostic cartridge on the basis of the irregularity of one side surface of the diagnostic cartridge (that is, the light-interception information from the photosensor 37).

Still further, in the embodiments, the operation of the accessor 7 is controlled so that the hand mechanism 7d regrips the cartridge 10 in a state where the cartridge 10 is introduced into the picker section 7g. At the cartridge 10 regripping operation by the hand mechanism 7d, the actuator 36 receives the biasing force of the coil spring 36c to press the other side surface of the cartridge 10 against the other guide member 35b, which finally serves as a positioning mechanism to always maintain the position of the other side surface of the cartridge 10 constant within the picker section 7g.

At this time, in the cartridge 10 regripping operation, for the purpose of preventing the cartridge 10 once released from the hand mechanism 7d from breaking out of the picker section 7g, the claw (locking member) 38 is placed on the guide member 35b side.

This claw 38 is disposed to protrude from the guide member 35b toward the cartridge side, and is swingable around a rotary shaft 38a and biased by an adequate force due to a spring 38b so that it is put out of the way by the cartridge 10 itself at the cartridge 10 inserting and extracting operations by the hand mechanism 7d while taking the locking condition with the cartridge 10 at the cartridge 10 regripping operation by the hand mechanism 7d.

In the embodiments, since the picker section 7g of the accessor 7 includes the type identifying mechanism, the actuator 36 acting as a positioning mechanism and the breakout (jump-out) preventing claw 38 as mentioned above, the following effects are attainable.

Each of various types of cartridges 10 is led into the picker section 7g by the hand mechanism 7d while being guided by the pair of guide members 35a, 35b. Further, the actuator 36 moves (taking the opening and closing conditions) in accordance with the irregularity (external dimension) of one side surface of the cartridge 10 introduced into the interior of the picker section 7g. The type of the cartridge 10 is identified utilizing the fact that its movement quantity varies in accordance with the external dimension of the cartridge 10 (the type of the cartridge 10).

More specifically, when the cartridge 10 is taken in the interior of the picker section 7g by the hand mechanism 7d, the roller 36a rotates to allow the movement of the cartridge 10 while coming into contact with one side surface of the cartridge 10 owing to the biasing force of the coil spring 36c, thus making the arm 36b swing around the rotary shaft 36e in accordance with the irregularity of the one side surface thereof. In synchronism with the swinging action of the arm 36b, the flag 36d moves, so that the photosensor 37 detects the movement quantity of this flag 36d as the light-interception information, with the identifying section (not shown) identifying the type of the cartridge 10 on the basis of the light-interception information from the photosensor 37.

In this way, the identification of the type of the cartridge 10 held in the picker section 7g is possible, and therefore, the processing (conveyance and insertion of cartridges to/into the storage unit or the MTU 5a, and other operations) corresponding to the identification result is certainly feasible, and since the plurality of types of cartridges 10 can simultaneously be handed within one library apparatus 1, the certain conveyance of the plurality of types of cartridges 10 is possible, thus providing a more useful apparatus to the users and further meeting a variety of needs from the users.

Moreover, although the hand mechanism 7d operates to regrip the cartridge 10 in a state where the cartridge 10 is taken in the interior of the picker section 7g, at this time, the roller 36a placed into contact with the one side surface of the cartridge 10 receives the biasing force of the coil spring 36c through the arm 36b to always press the other side surface of the cartridge 10 against the guide member 35b irrespective of its type.

Consequently, even in the case of handling various types of cartridges 10, within the picker section 7g the various types of cartridges 10 can always be reset at a constant position (reference position) where the other side surface of the cartridge 10 is brought into contact with the guide member 35b. Accordingly, it is possible to position the cartridge 10 (reset the cartridge 10 to the reference position) concurrently with identifying the type of the cartridge 10 within the accessor 7, which permits the cartridge 10 to be easily inserted into the storage unit or the MTU 5a in accordance with its type.

Furthermore, when the hand mechanism 7d regrips the cartridge 10 as mentioned above, in case that the cartridge 10 is shifted from the interior of the picker section 7g to the external, the cartridge 10 is locked with the claw 38 to prevent the cartridge 10 from falling from the interior of the picker section 7g to the external.

In more detail, since the appropriate biasing force due to the spring 38b works on the claw 38, when the hand mechanism 7d is moved by the servo motor 31 and the timing belt 32 in the forward and backward directions for the insertion and extraction of the cartridge 10, the claw 38 receives the drive force due to the servo motor 31 from the cartridge 10 to be put out of the way against the biasing force of the spring 38b so as not to limit the insertion and extraction of the cartridge 10. On the other hand, owing to the biasing force of the spring 38b, only the self-weight of the cartridge 10 can not put the claw 38 out of the way, so that the cartridge 10 gets into the locked condition with the claw 38.

Accordingly, when positioning the cartridge 10 (resetting the cartridge 10 to the reference position) within the accessor 7, even if the hand mechanism 7d releases the cartridge 10, the break-out preventing claw 38 works to always maintain the state in which the cartridge 10 is surely held in the picker section 7g, and hence, the cartridge 10 is prevented from breaking out of the picker section 7g due to the vibrations and the abnormal actions of the accessor 7 itself, with the result that the library apparatus 1 is operable with a high reliability.

Still further, in the embodiments, the accessor 7 is capable of identifying not only the cartridge 10 accommodating a storage medium such as a magnetic tape but also a diagnostic cartridge, and in cases where the hand mechanism 7d grips the diagnostic cartridge, the corresponding operation becomes possible.

Thus, for diagnosing or checking whether or not the dimension of the accessor 7 itself is out of order, even using a special-purpose cartridge for diagnosis, it is possible to recognize that the cartridge used is for the purpose of the diagnosis, and therefore, the diagnosing operation for the accessor 7 itself is smoothly and surely feasible.

At the switching from the diagnosis to the normal operation, even if the hand mechanism 7d is in the state of gripping the diagnostic cartridge, because of the recognition thereof, it is possible to prevent the wrong operation that the apparatus 1 gets into the normal action while the hand mechanism 7d grips the diagnostic cartridge.

[2-4] Description of Hand Mechanism

Figure 11:
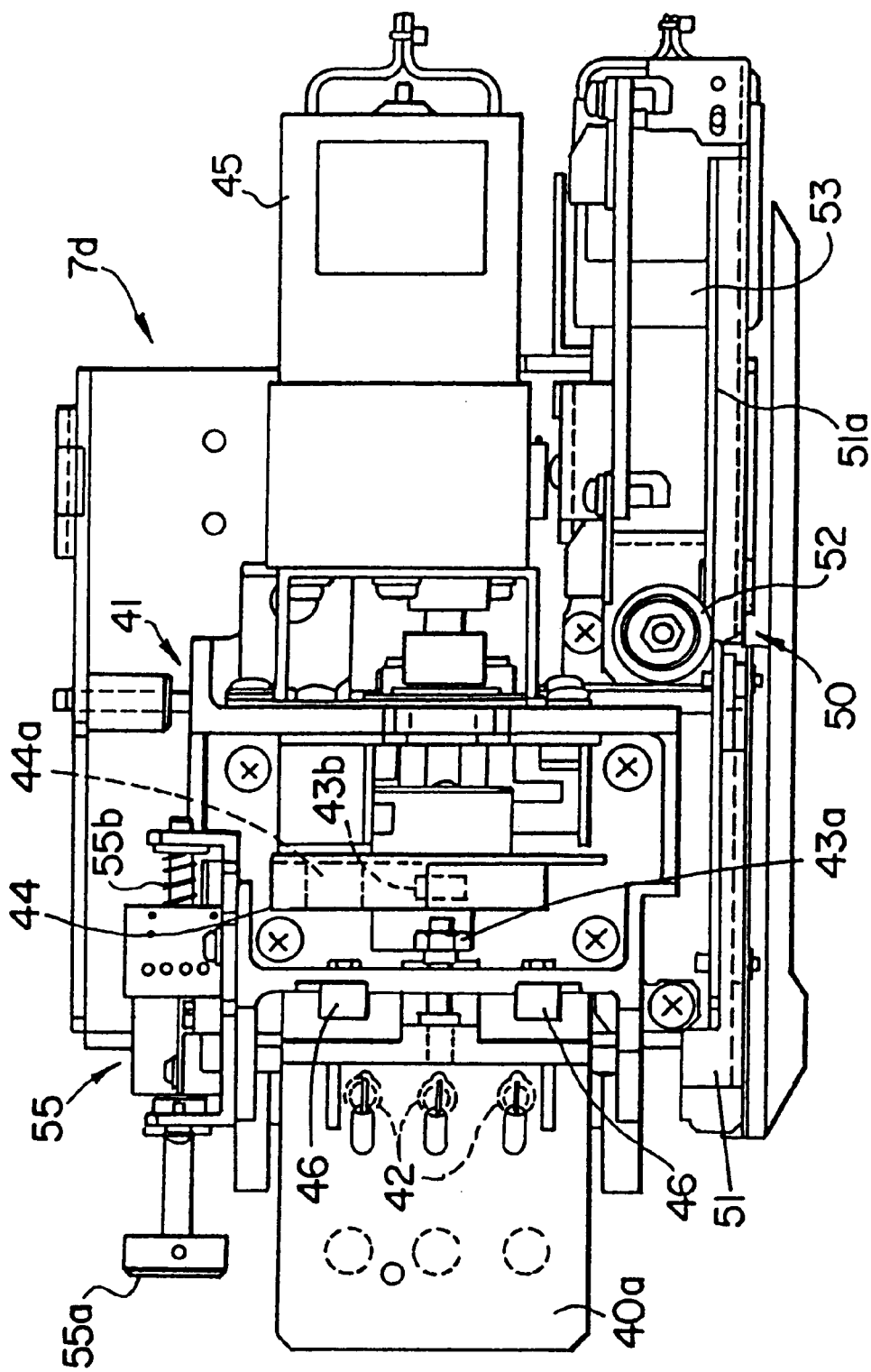
FIG. 11 is a plan view showing the hand mechanism of the accessor in the embodiments of this invention.
Figure 12:
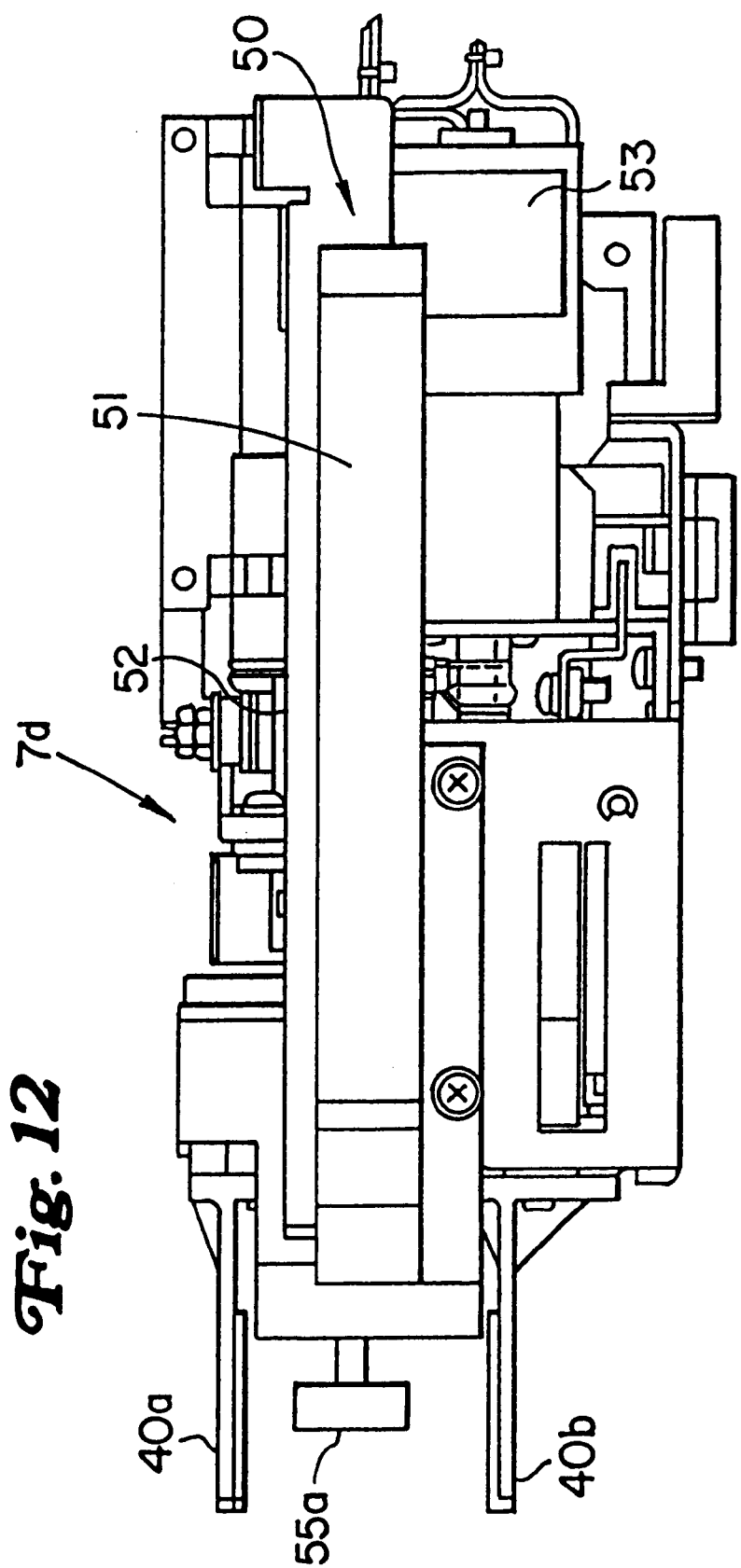
FIG. 12 is a side elevational view showing the hand mechanism of the accessor in the embodiments of this invention.

FIGS. 11 and 12 are respectively plan and side elevational views showing the hand mechanism 7d of the accessor 7 in the embodiments of this invention. As shown in FIGS. 11 and 12, this hand mechanism 7d is, as mentioned before, provided with the pair of upper and lower hand members 40a, 40b, the hand base 41, the spring 42, the pair of upper and lower cam followers 43a, 43b, the cam 44, the hand opening and closing drive motor 45, the pair of linear ways 46, the mounter mechanism 50 and the CIP/CSP unit 55. In these illustrations, the reference numerals being the same as those taken in the above description denote the same or substantially same parts.

The pair of upper and lower hand members 40a, 40b come into contact with the cartridge 10 from the above and below to grip the cartridge 10, and are fitted onto the hand base 41 to be allowed to slide vertically through the pair of left- and right-hand leaner ways 46, 46. Interposed between the hand members 40a, 40b is the springs 42 which biases the hand members 40a, 40b in the closing directions of gripping the cartridge 10.

Furthermore, the cam followers 43a, 43b are fitted to the hand members 40a, 40b, respectively, and the cam 44 is placed between the pair of upper and lower cam followers 43a, 43b. This cam 44 is made to have a large-diameter portion for pressing the pair of upper and lower cam followers 43a, 43b against the biasing force of the spring 42 to enlarge the separation therebetween to make the upper and lower hand members 40a, 40b come into the open condition, and to have a small-diameter portion for making a separation from the cam followers 43a, 43b, and further to have a lock groove 44a which will be described below.

The lock groove 44a functions as a locking mechanism to fix the pair of upper and lower hand members 40a, 40b to the hand base 41 in a state where the cartridge 10 is gripped between the hand members 40a, 40b. In a manner of holding the lower cam follower 43b, the hand members 40a, 40b are fixed to the hand base 41 in a state of gripping the cartridge 10.

In addition, the hand opening and closing drive motor 45 rotationally drives the cam 44 so that the cam 44 takes one of a hand open position to make the large-diameter portion stand between the cam followers 43a, 43b, a cartridge gripping position to make the small-diameter portion exist between the cam followers 43a, 43b, and a lock position to make the lock groove 44a fix the hand members 40a, 40b to the hand base 41 in a state of gripping the cartridge 10.

Still further, the hand mechanism 7d is provided with the mounter mechanism 50 for applying a pressing force to the cartridge 10 to insert the cartridge 10 into the MTU 5a. In the embodiments, the mounter mechanism 50 is composed of the mounter arm 51, the pinion 52 and the mounter arm drive motor 53.

In this construction, the mounter arm 51 is placed to be movable in the direction of coming into contact with the rear end surface of the cartridge 10 gripped by the hand mechanism 7d to push it into the MTU 5a. The pinion 52 is made to engage with the rack 51a formed on the mounter arm 51, and is rotationally driven by the motor 53 to shift the mounter arm 51 in the cartridge pushing-in direction.

In addition, the mounter mechanism 50 is equipped with a buffer mechanism (not shown) for absorbing the excessive pressing force in the case that a pushing force exceeding a given load works on the cartridge 10. This buffer mechanism is, for example, constructed by putting a resin bearing or a resin spacer between the pinion 52 and a drive shaft (not shown) of the motor 53.

On the other hand, the hand mechanism 7d incorporates the CIP/CSP unit 55 which in turn, comprises a CIP (Cartridge In Picker, a first sensor; not shown) for detecting the fact that the cartridge 10 is put between the hand members 40a, 40b and a CSP (Cartridge Secured Position, a second sensor; not shown) for sensing the fact that the rear end surface of the cartridge 10 reaches a given position after the detection of the insertion of the cartridge 10 by the CIP.

These CIP and CSP are composed of photosensors, respectively, and undergo the light-interception due to a flag (not shown) driven by an actuator 55a, thereby detecting the insertion of the cartridge 10 and the certainly held condition of the cartridge 10. The actuator 55a is pressed by a spring 55b in the forward direction (left-hand direction in FIG. 11), and when the cartridge 10 comes in between the hand members 40a, 40b, as shown in FIGS. 9 and 10, the actuator 55a comes into contact with the rear end surface of the cartridge 10 to be pressed against the biasing force of the spring 55b, thus driving the flag to successively operate the CIP and the CSP.

In the embodiments, since the hand mechanism 7d of the accessor 7 has the mounter mechanism 50 and the CIP/CSP unit 55 in addition to being constructed as described above, the following effects are obtainable.

When the cam 44 is driven by the motor 45 to take the hand open position, the large-diameter portion of the cam 44 presses the cam followers 43a, 43b to enlarge the separation therebetween, thus opening the hand members 40a, 40b. When gripping the cartridge 10 by the hand mechanism 7d, the cartridge 10 is put between the hand members 40a, 40b taking the open condition and, subsequently, the cam 44 is driven by the motor 45 to assume the cartridge gripping position, so that the hand members 40a, 40b come into contact with the cartridge 10 from the above and below in response to the biasing force of the spring 42, thus gripping the cartridge 10.

At this time, since the gap is defined between the small-diameter portion of the cam 44 and the cam followers 43a, 43b, the hand members 40a, 40b are movable vertically by a quantity corresponding to this gap (looseness) in a state of gripping the cartridge 10.

Accordingly, even if a difference in position between the cartridge insertion opening of the MTU 5a and the cartridge 10 gripped by the hand mechanism 7d slightly occurs, the positional difference can be absorbed by the vertical movements corresponding to the aforesaid gap, and by making the most of that gap as a buffer, the certain insertion of the cartridge 10 into the MTU 5a becomes possible.

Furthermore, when the cam 44 is driven by the motor 45 to come to the lock position, the cam follower 43b is held in the lock groove 44a of the cam 44, and the hand members 40a, 40b are fixed to the hand base 41 in a state of gripping the cartridge 10.

For instance, for extracting the cartridge 10 from the storage unit, at the time that a locking member locking the cartridge 10 in the storage unit is disconnected from the cartridge 10, it is necessary to slightly lift the cartridge 10 in a state of being gripped by the hand members 40a, 40b. In this case, in the embodiments, as mentioned above, the hand members 40a, 40b are fixed to the hand base 41 through the lock mechanism (the lock groove 44a of the cam 44) while gripping the cartridge 10, with the result that it is possible to stop the vertical movements of the hand members 40a, 40b due to the looseness, and hence to surely lift the cartridge 10.

Still further, when the cartridge 10 is inserted into the MTU 5a, the cartridge 10 is conveyed through the hand mechanism 7d up to the cartridge insertion opening of the MTU 5a and the hand members 40a, 40b are opened there, and subsequently, the pinion 52 is rotationally driven by the motor 53 so that the mounter arm 51 is shifted in the cartridge pushing-in direction by the pinion 52 and the rack 51a gearing with this pinion 52. Whereupon, the cartridge 10 is inserted into the depth of the MTU 5a while being pressed by the mounter arm 51, which makes sure the insertion of the cartridge 10 into the depth of the MTU 5a.

At this time, in the embodiments, when a pressing force exceeding a given load works on the cartridge 10, the extra pressing force is absorbable by the buffer mechanism provided between the pinion 52 and the drive shaft on the motor 53 side. In this buffer mechanism, a slip occurs through the resin bearing or the resin spacer between the pinion 52 and the drive shaft on the motor 53 side, and a frictional force produced at that time absorbs the extra pressing force, thereby preventing an excessive pressing force from working on the cartridge 10. Accordingly, even if an excessively large load occurs toward the cartridge 10, it is possible to protect the cartridge 10 and its peripheral portions and further the mounter mechanism 50 and its drive system (the motor 53 and others) therefrom.

In addition, in a state where the detection result of the CIP (first sensor) shows that the cartridge 10 exists between the hand members 40a, 40b, the CSP (second sensor) can sensitively detect the fact that the rear end surface of the cartridge 10 arrives at a given position, so that the hand mechanism 7d can certainly grip the cartridge 10 discharged from the MTU 5a.

Owing to the hand mechanism 7d having multifuction as mentioned above, without the use of the cartridge giving and receiving mechanism (feeder), the direct insertion and extraction of the cartridge 10 becomes possible between the MTU 5a and the hand mechanism 7d, which can realize the size reduction and lower manufacturing cost of the library apparatus 1.

[3] Description of First Embodiment

Even in the embodiments, since the angles of insertion/discharge of the cartridge 10 are different from each other among units, it is necessary to change the cartridge inserting/extracting angle of the hand mechanism 7d.

As the cartridge insertion and extraction directions (angles) of the hand mechanism 7d in the embodiments, there are taken a horizontal direction (0°) and a direction looking downward by a given angle with respect to the horizontal direction. In the case of the MTU 5a, in general the cartridge 10 is inserted and pulled out in/from the horizontal direction (0°). On the other hand, in the case of the storage unit or the like, the cartridge 10 is stored in a condition looking (inclined) downward (for example, by 12°) relative to the horizontal direction to prevent them from dropping from the cells of the storage unit due to the vibrations caused by earthquakes and others, and therefore, the insertion and extraction of the cartridge 10 is made at that angle.

For this reason, an accessor 7 according to a first embodiment of this invention is, as shown in FIGS. 1 and 13 to 16, provided with a tilt mechanism 15 for adjusting the angle of the cartridge inserting/extracting directions with respect to a horizontal plane.

Figure 1A:
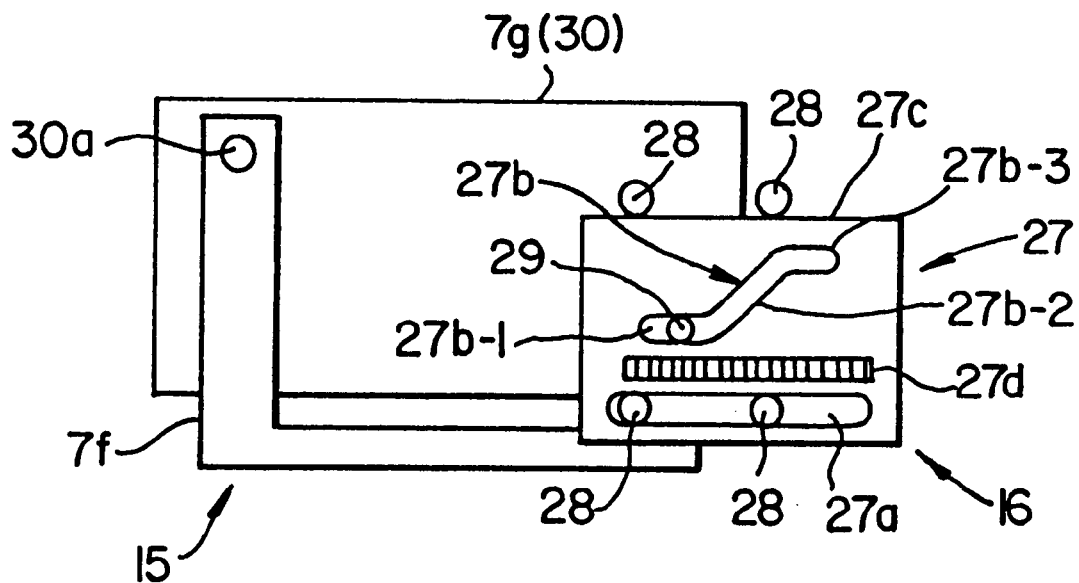
FIGS. 1A and 1B are side elevational views illustratively showing a tilt mechanism of a cartridge transferring robot (accessor) for a library apparatus according to a first embodiment of the present invention, and of these illustrations.
Figure 1B:
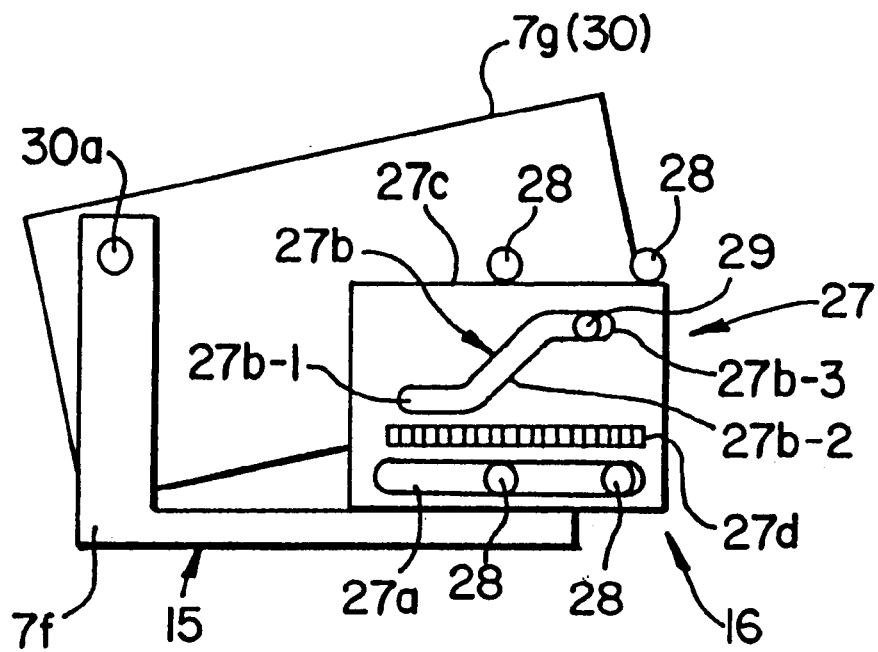
Figure 13:
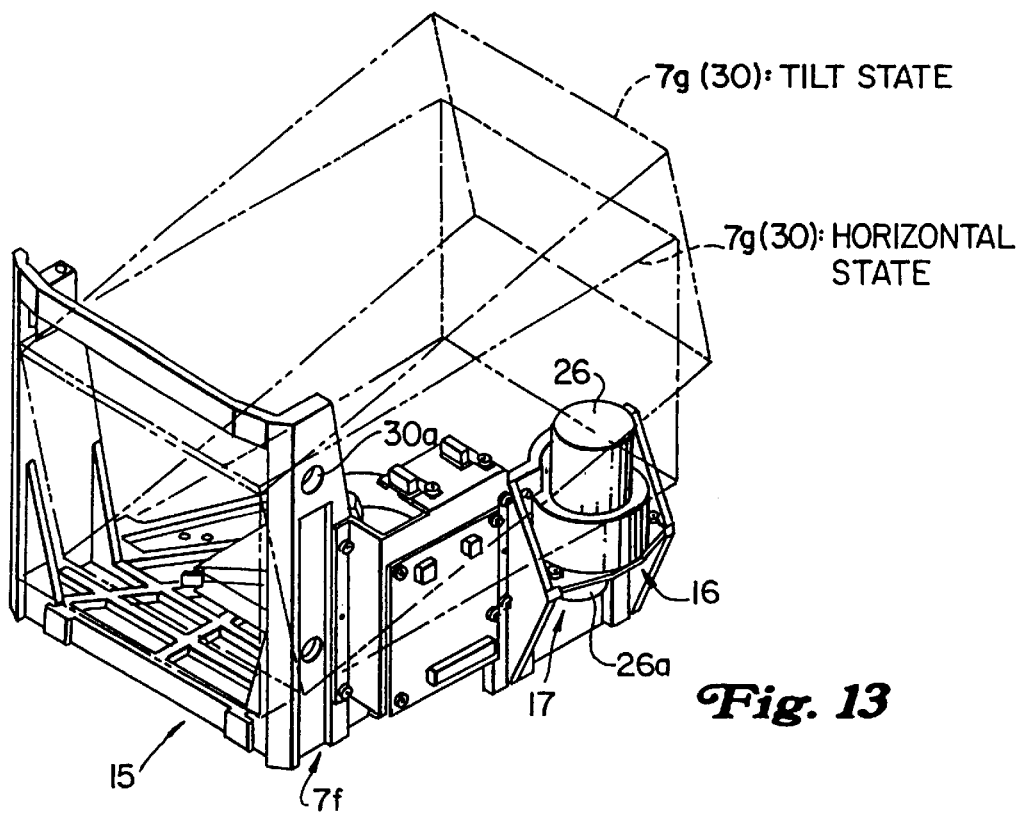
FIGS. 13 and 14 are perspective views showing a principal portion (tilt base) of a tilt mechanism of the accessor according to the first embodiment.
Figure 14:
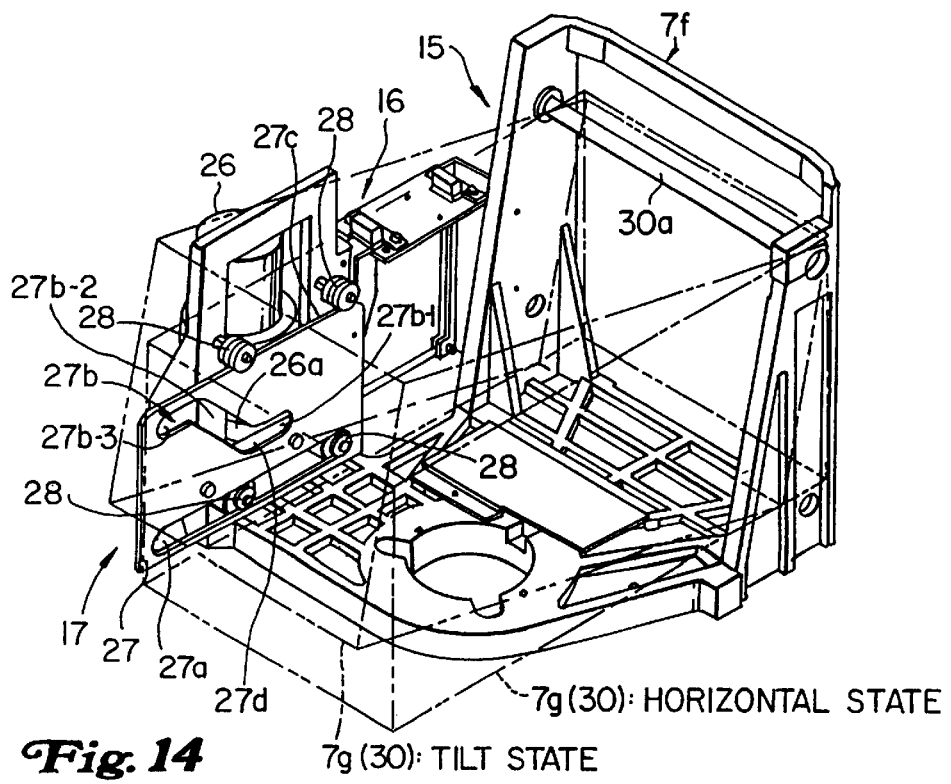
Figure 15:
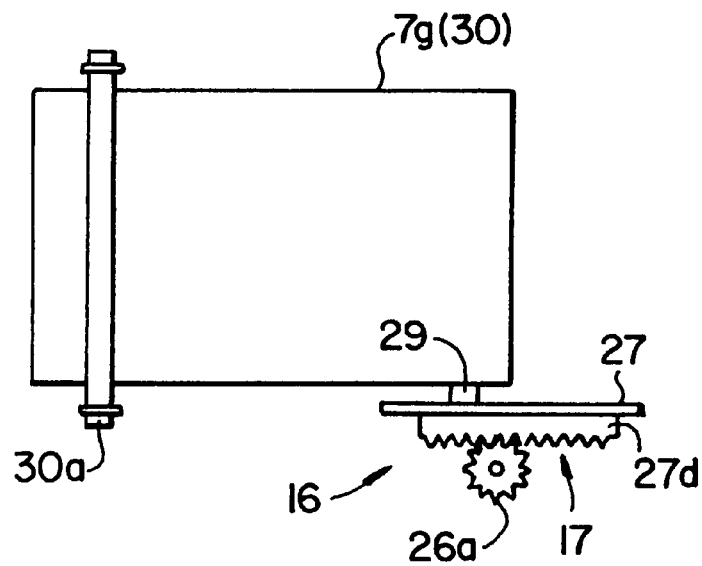
FIG. 15 is a plan view illustratively showing the tilt mechanism of the accessor according to the first embodiment.
Figure 16:
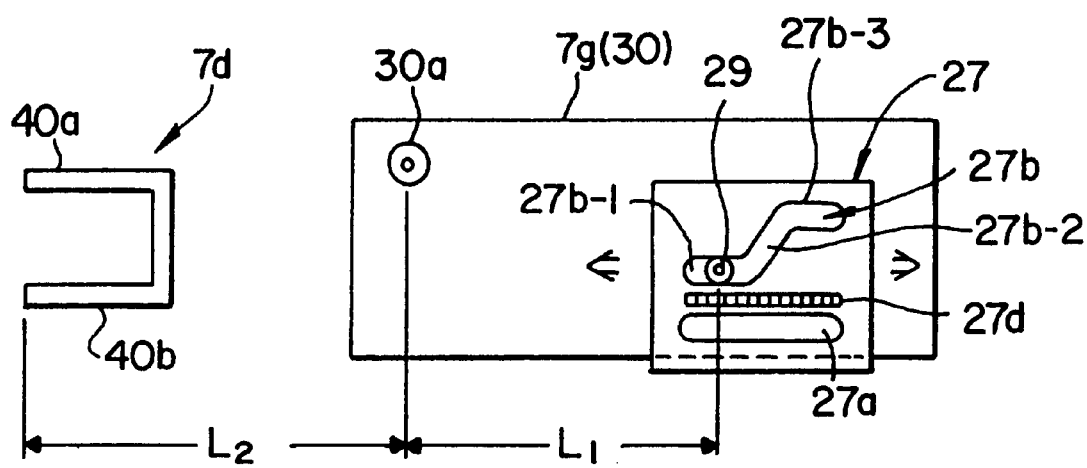
FIG. 16 is an illustrative side elevational view useful for describing an operation of the first embodiment.

FIGS. 1A and 1B are side elevational views illustratively showing the tilt mechanism 15 of the accessor 7 according to the first embodiment of this invention, and of these drawings, FIG. 1A shows a state where a picker section 7g is disposed in horizontal directions while FIG. 1B illustrates a case in which the picker section 7g is in a tilt condition (a condition looking downward by 12° from the horizontal direction). Further, FIGS. 13 to 16 also show the tilt mechanism 15 of the accessor 7 according to the first embodiment, and in more detail, FIGS. 13 and 14 are perspective views showing a principal portion (tilt base 7f) of the tilt mechanism 15, FIG. 15 is an illustrative plan view thereof, and FIG. 16 is an illustrative side elevational view for explaining an operation thereof. In these illustrations, the reference numerals being the same as those used in the above description depict the same or substantially same parts, and the detailed description thereof will be omitted for brevity.

As shown in FIGS. 1A, 1B, 13 and 14, the picker section 7g (picker base 30) is fitted to a tilt base 7f to be swingable around a supporting shaft (rotary shaft) 30a, and is swingingly driven around the supporting shaft 30a through the use of a swinging drive mechanism 16 comprising a tilt motor 26, a plate cam 27 and a guide roller 28 placed on the side of a supporting base 7e and a cam follower 29 located on the picker section 7g side.

That is, the tilt mechanism 15 according to this embodiment is composed of the tilt base 7f and the swinging drive mechanism 16, and the picker section 7g is supported by the tilt base 7f to be swingable around the supporting shaft 30a placed at an upper portion of the picker section front surface side (the left side in FIGS. 1A, 1B and 15) facing the inserting and extracting place for the cartridge 10. Further, the swinging drive mechanism 16 is disposed on a lower side surface of the rear side (the right side in FIGS. 1A, 1B and 15) of the picker section 7g.

In addition, the swinging drive mechanism 16 is made up of a cam follower 29 protrusively fitted onto a rear side surface of the picker section 7g, a plate cam 27 located to be movable in the cartridge inserting/extracting direction with respect to the tilt base 7f for guiding the cam follower 29 in vertical directions in accordance with its forward and backward movements, and a drive mechanism 17 for moving the plate cam 27 in the cartridge inserting/extracting direction with respect to the tilt base 7f.

As shown in FIGS. 1A, 1B and 14, on the tilt base 7f side, two sets (pairs) of upper and lower guide rollers 28, 28 for supporting the plate cam 27 are pivotally fitted onto a rear side surface of the picker section 7g on the front and rear sides, respectively.

The plate cam 27 has an elongated guide hole 27a made to extend in the forward and backward directions, and this elongated guide hole 27a engages with the pair of lower guide rollers 28, 28 pivotally fitted onto the tilt base 7f side. In addition, the pair of upper guide rollers 28, 28 pivotally fitted onto the tilt base 7f side are brought into contact with a horizontal upper edge portion 27c of the plate cam 27 from the above. Whereupon, the plate cam 27 is attached to the tilt base 7f to be movable in the cartridge inserting/extracting direction (forward and backward directions) while being guided by the guide rollers 28.

Furthermore, as shown in FIGS. 1A, 1B, 14 and 15, a rack 27d is formed on the plate cam 27, and is engaged with a pinion 26a fitted over a drive shaft (not shown) of the tilt motor 26 as shown in FIGS. 14 to 16. In FIG. 15, the tilt motor 26 is omitted from the illustration.

Accordingly, when the pinion 26a is rotationally driven by the tilt motor 26, this rotational movement is converted into linear movements of the plate cam 27 through the rack 27d gearing with the pinion 26a, so that the plate cam 27 is driven to reciprocate in the cartridge inserting/extracting direction (in the forward/backward directions). That is, the tilt motor 26, the pinion 26a and the rack 27d organize the drive mechanism 17.

In addition, the plate cam 27 has an elongated swinging drive hole 27b to be made to engage with the cam follower 29. This elongated swinging drive hole 27b has two horizontal portions 27b-1, 27b-3 different in height from each other and an inclined portion 27b-2 making the connection between these horizontal portions 27b-1, 27b-3.

The front side horizontal portion 27b-1 is for maintaining the picker section 7g in the horizontal condition. As shown in FIG. 1A, in a state where the cam follower 29 is positioned at the horizontal portion 27b-1 of the elongated hole 27b, the picker section 7g is disposed horizontally, with the result that the cartridge inserting/extracting directions of the hand mechanism 7d is maintained to be the horizontal direction.

On the other hand, the rear side horizontal portion 27b-3 is formed at a position higher than the front side horizontal portion 27b-1, and is for maintaining the picker section 7g in the tilt condition in which the front surface of the picker section 7g is inclined downwardly by a given angle (for example, 12°) with respect to the horizontal direction. If the plate cam 27 is shifted from the FIG. 1A state in the front direction (in the left-hand direction in FIG. 1A) so that the cam follower 29 moves from the horizontal portion 27b-1 through the inclined portion 27b-2 to the horizontal portion 27b-3 while being guided, as shown in FIG. 1B, the picker section 7g swings around the supporting shaft 30a to get into the tilt condition, with the result that the cartridge inserting/extracting direction of the hand mechanism 7d is taken to be the direction looking downward by a given angle (for example, 12°) with respect to the horizontal direction.

In the tilt mechanism 15 of the accessor 7 according to the first embodiment thus constructed, the picker section 7g is swingingly driven around the supporting shaft 30a, placed on the picker section front surface side, through the swinging drive mechanism 16 disposed on the rear side of the picker section 7g, so that the cartridge inserting/extracting direction is adjustable with respect to a horizontal plane.

More specifically, since the supporting point (i.e., the position of the supporting shaft 30a) on the tilt action is located on the front side of the picker section 7g while the effort point (the driven position by the swinging drive mechanism 16, i.e., the position of the cam follower 29) is situated on the rear side of the picker section 7g, as shown in FIG. 16, the distance $L_1$ from the supporting point (supporting shaft 30a) to the effort point (cam follower 29) can be set to be sufficiently longer than the distance $L_2$ from the supporting point to the tip position of the hand mechanism 7d (hand members 40a, 40b).

Accordingly, in the case of the tilt mechanism 15 according to this embodiment, $L_2/L_1$ can be set to below 1, and the dimensional error dy at the effort point (cam follower 29) can be prevented from being enlarged and amplified at the tip position of the hand mechanism 7d.

As described above, in the case of the accessor 7 according to the first embodiment of this invention, with only the change of the positional relationship between the supporting point and the effort point on the tilt action, it is possible to sharply improve the accuracy of the cartridge inserting/extracting direction of the hand mechanism 7d, and further to ensure the positional accuracy of the tip portion of the hand mechanism 7d which is sufficient for the direct insertion and extraction of the cartridge 10 into/from the MTU 5a. Thus, without installing the cartridge giving and receiving mechanism at every MTU 5a, the direct insertion and extraction of the cartridge 10 into/from each of the MTUs 5a through the hand mechanism 7d becomes possible, which contributes to the size reduction and lower manufacturing cost of the library apparatus 1.

[4] Description of Second Embodiment

Figure 17:
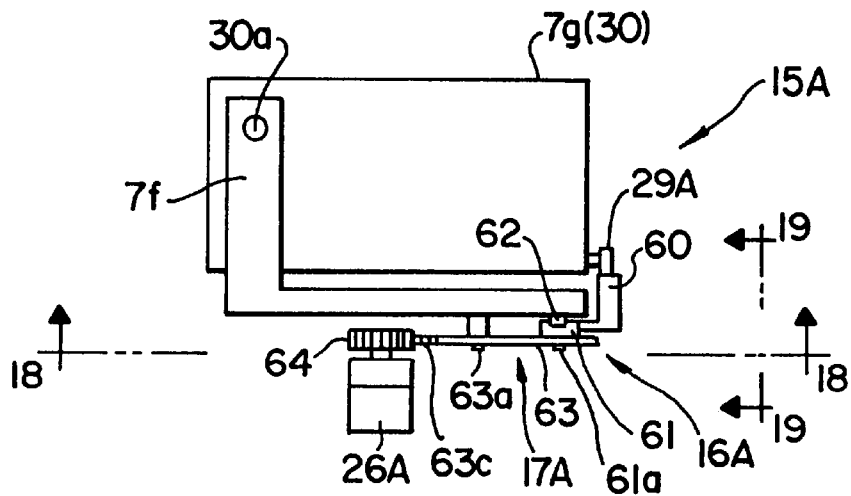
FIG. 17 is a side elevational view illustratively showing a tilt mechanism of a cartridge transferring robot (accessor) for a library apparatus according to a second embodiment of this invention.
Figure 18:
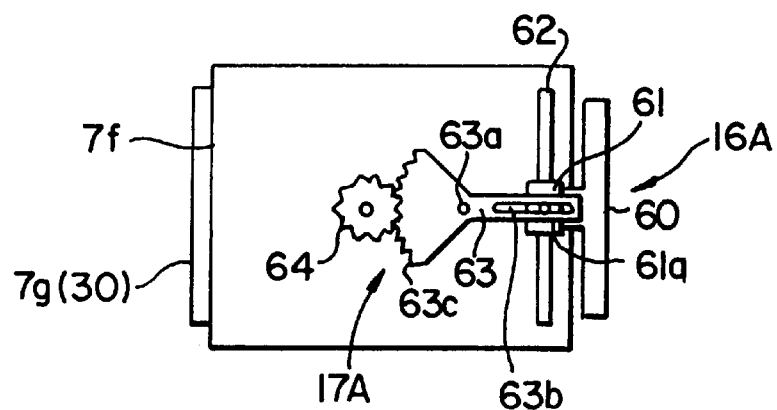
FIG. 18 is a cross-sectional view taken along a line XVIII—XVIII of FIG. 17.
Figure 19:
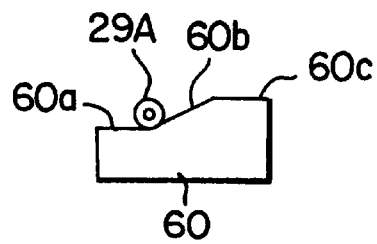
FIG. 19 is an illustration of a portion indicated by an arrow XIX in FIG. 17.

FIGS. 17 to 19 are illustrations of an accessor according to a second embodiment of this invention, FIG. 17 being a side elevational view illustratively showing a tilt mechanism of the accessor, FIG. 18 being a cross-sectional view taken along a line XVIII—XVIII of FIG. 17, and FIG. 19 being an illustration of a portion indicated by an arrow XIX of FIG. 17. As shown in FIGS. 17 to 19, a tilt mechanism 15A according to the second embodiment is composed of a tilt base 7f similar to that of the first embodiment and a swinging drive mechanism 16A. In these illustrations, the reference numerals being the same as those in the above description signify the same or substantially same parts, and the detailed description thereof will be omitted for brevity.

The swinging drive mechanism 16A in the second embodiment is composed of a cam follower 29A, a block cam 60 and a drive mechanism 17A.

The cam follower 29A is made to protrude from a central and lower portion of the rear surface of a picker section 7g toward the rear side.

The block cam 60 is located to be movable in left- and right-hand directions (vertical directions in FIG. 18, left- and right-hand directions in FIG. 19) perpendicular to the cartridge inserting/extracting direction with respect to the tilt base 7f. That is, as shown in FIGS. 17 and 18, an LM guide 62 is fixed onto a rear side bottom surface of the tilt base 7f along left- and right-hand directions, while the block cam 60 is fixed to a guide block 61 which slides along the LM guide 62.

In addition, in order to guide the cam follower 29A vertically in accordance with left- and right-hand movements of the block cam 60, as shown in FIG. 19, on the top surface of the block cam 60 there are formed two horizontal surfaces 60a, 60c different in height from each other and brought into contact with the cam follower 29A and an inclined surface 60b making the connection between these horizontal surfaces 60a, 60c. The center of gravity of the picker section 7g is set such that the cam follower 29A presses the top surface side of the block cam 60 even if a hand mechanism 7d assumes the most advanced condition in a state of gripping the cartridge 10.

The horizontal surface 60a is for the purpose of maintaining the picker section 7g in the horizontal condition. That is, in a state where the cam follower 29A is positioned on the horizontal surface 60a of the block cam 60 as shown in FIG. 19, the picker section 7g takes the horizontal condition so that the cartridge inserting/extracting direction of the hand mechanism 7d is maintained to be the horizontal directions. FIG. 19 illustrates only the cam follower 29A and the block cam 60.

Furthermore, the horizontal surface 60c is formed at a position higher in height than that of the horizontal surface 60a, and is for maintaining the picker section 7g in the tilt condition in which the front surface of the picker section 7g is inclined downward by a given angle (for example, 12°) with respect to the horizontal direction. If the block cam 60 is moved from the FIG. 19 state in the left-hand direction through the use of the drive mechanism 17A, which will be described below, so that the cam follower 29A is shifted from the horizontal surface 60a through the inclined surface 60b to the horizontal surface 60c while guided, this cam follower 29A advances upwardly so that the picker section 7g swings around a supporting shaft 30a to come into the tilt condition where the cartridge inserting/extracting direction of the hand mechanism 7d is maintained to look downward by the given angle (for example, 12°) with respect to the horizontal direction.

The drive mechanism 17A serves to move the block cam 60 in directions (the aforesaid left- and right-hand directions) perpendicular to the cartridge inserting/extracting direction with respect to the tilt base 7f, and as shown in FIGS. 17 and 18, is composed of a link member 63, a gear 64 and a tilt motor 26A in addition to the aforesaid guide block 61 and LM guide 62.

The link member 63 is pivotally fitted onto a substantially central portion of the bottom surface of the tilt base 7f to be rotatable around a vertical rotary shaft 63a. This link member 63 has an elongated hole (slot) 63b made in its longitudinal directions, with this elongated hole 63b engaging with a projection 61a made to protrude downwardly from the guide block 61. In addition, this link member 63 has a sectorial (fan-like) gear section 63c. The gear 64 engaging with this sectorial gear section 63c is rotationally driven by the tilt motor 26A.

Accordingly, when the gear 64 is rotationally driven by the tilt motor 26A, the link member 63 is rotationally driven around the rotary shaft 63a through the sectorial gear section 63c engaging with the gear 64. Further, on the rotation of the link member 63, the guide block 61 is driven along the LM guide 62 through the projection 61a engaging with the elongated hole 63b. Thus, the rotational movement of the tilt motor 26A is converted in a linear movement of the guide block 61 in the left- and right-hand directions, with the result that the block cam 60 reciprocates in the left- and right-hand directions.

In the tilt mechanism 15A of the accessor 7 according to the second embodiment of this invention thus arranged, through the use of the drive mechanism 17A, the block cam 60 is driven in directions (left- and right-hand directions) normal to the cartridge inserting/extracting direction, and the cam follower 29A is guided up and down in accordance with the movements of the block cam 60 in the left- and right-hand directions.

Consequently, through the swinging drive mechanism 16A disposed on the rear side of the picker section 7g, the picker section 7g is swingingly driven around the supporting shaft 30a placed on the picker section front surface side to adjust the angle of the cartridge inserting/extracting direction with respect to a horizontal plane, which can offer the same effects as those of the above-described first embodiment.

[5] Description of Third Embodiment

Figure 20:
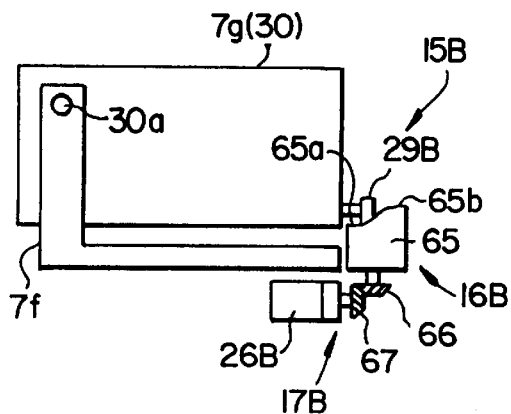
FIG. 20 is a side elevational view illustratively showing a tilt mechanism of a cartridge transferring robot (accessor) for a library apparatus according to a third embodiment of this invention.
Figure 21:
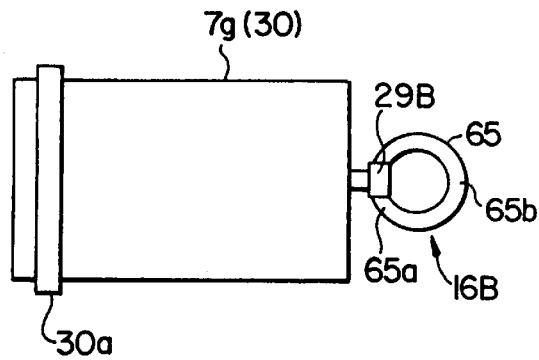
FIG. 21 is a plan view illustratively showing the tilt mechanism of the accessor according to the third embodiment.

FIGS. 20 and 21 show a cartridge transferring robot (accessor) for a library apparatus according to a third embodiment of the present invention, and are respectively side elevational and plan views illustratively showing a tilt mechanism. As shown in FIGS. 20 and 21, a tilt mechanism 15B in the third embodiment is composed of a tilt base 7f similar to that of the first embodiment and a swinging drive mechanism 16B. In these illustrations, the reference numerals being the same as those in the above description signify the same or substantially same parts, and the detailed description thereof will be omitted for simplicity. In FIG. 21, the tilt base 7f is omitted from the illustration.

The swinging drive mechanism 16B in the third embodiment is made up of a cam follower 29B, a cylindrical cam 65 and a rotating drive mechanism 17B.

The cam follower 29B is made to protrude backwardly from a central lower portion of the rear surface of a picker section 7g as well as the cam follower 29A in the second embodiment.

The cylindrical cam 65 is provided to be rotatable around its vertical axis through a bearing (not shown) with respect to the tilt base 7f.

In addition, in order to guide the cam follower 29B vertically in accordance with the rotational movement of the cylindrical cam 65, as shown in FIG. 20, on the top surface of the cylindrical cam 65 there are formed two surfaces different in height from each other and made to come into contact with the cam follower 29B, i.e., a low-level surface 65a and a high-level surface 65b, which are a continuous relation to each other through smooth inclined surfaces. Incidentally, as in the case of the second embodiment, the center of gravity of the picker section 7g is set such that the cam follower 29B presses the top surface side of the cylindrical cam 65 even if a hand mechanism 7d assumes the most advanced condition in a state of gripping the cartridge 10.

The low-level surface 65a acts to maintain the picker section 7g in the horizontal condition. That is, in a state where the cam follower 29B stands on the low-level surface 65a of the cylindrical cam 65 as shown in FIG. 20, the picker section 7g takes the horizontal condition, so that the cartridge inserting/extracting direction by the hand mechanism 7d is maintained to be horizontal.

On the other hand, the high-level surface 65b is formed at a position higher in height than that of the low-level surface 65a, and is for maintaining the picker section 7g in the tilt condition in which the front surface of the picker section 7g is inclined downwardly by a given angle (for example, 12°) with respect to the horizontal direction. When the cylindrical cam 65 is rotationally driven from the FIG. 20 state through the rotating drive mechanism 17B, which will be described below, so that the cam follower 29B is shifted from the low-level surface 65a to the high-level surface 65b while guided, the cam follower 29B is advanced upwardly so that the picker section 7g rocks around a supporting shaft 30a to get into the tilt condition, with the result that the cartridge inserting/extracting direction of the hand mechanism 7d is kept to be inclined downwardly by the given angle (for example, 12°) with respect to the horizontal direction.

The rotating drive mechanism 17B serves to rotate the cylindrical cam 65 around its vertical axis with respect to the tilt base 7f, and as shown in FIG. 20, is composed of bevel gears 66, 67 and a tilt motor 26B.

The tilt motor 26B is installed on the rear bottom surface of the tilt base 7f in a state where its drive shaft is directed backwardly (in the right-hand direction in FIG. 20). The bevel gear 67 is fitted over the drive shaft of the tilt motor 26B, and the bevel gear 66 is coaxially fitted to a lower portion of the cylindrical cam 65, with these bevel gears 66, 67 being geared with each other.

Accordingly, when the bevel gear 67 is rotationally driven by the tilt motor 26B, the bevel gear 66 engaging with the bevel gear 67 is rotationally driven so that the rotating force of the tilt motor 26B is transferred to the cylindrical cam 65 to make the cylindrical cam 65 rotationally driven around its vertical axis.

In the tilt mechanism 15B of the accessor 7 according to the third embodiment thus arranged, the cylindrical cam 65 is rotationally driven around its vertical axis through the rotating drive mechanism 17B, while the cam follower 29B is guided vertically in accordance with the rotational movement of the cylindrical cam 65.

Consequently, through the swinging drive mechanism 16B disposed on the rear side of the picker section 7g, the picker section 7g is swingingly driven around the supporting shaft 30a located on the picker section front surface side, thus adjusting the angle of the cartridge inserting/extracting direction with respect to the horizontal plane, which can offer the same effects as those of the above-described first embodiment.

[6] Description of Fourth Embodiment

Figure 22A:
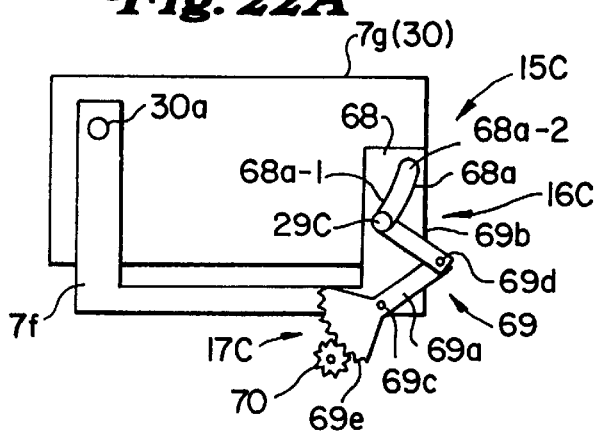
FIGS. 22A and 22B are side elevational views illustratively showing a tilt mechanism of a cartridge transferring robot (accessor) for a library apparatus according to a fourth embodiment of this invention, and of these illustrations.
Figure 22B:
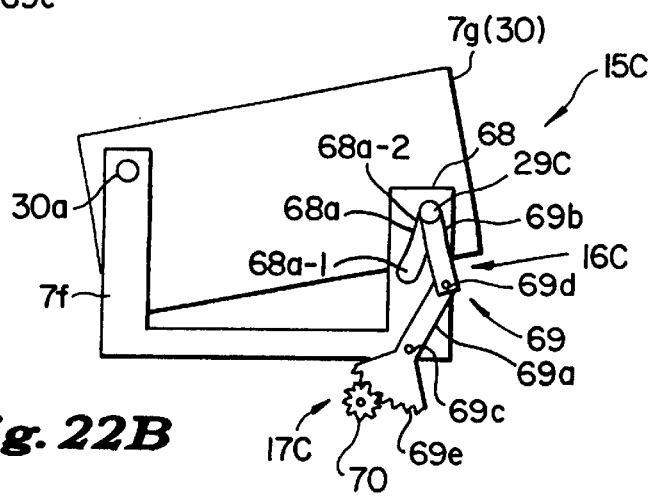
Figure 23:
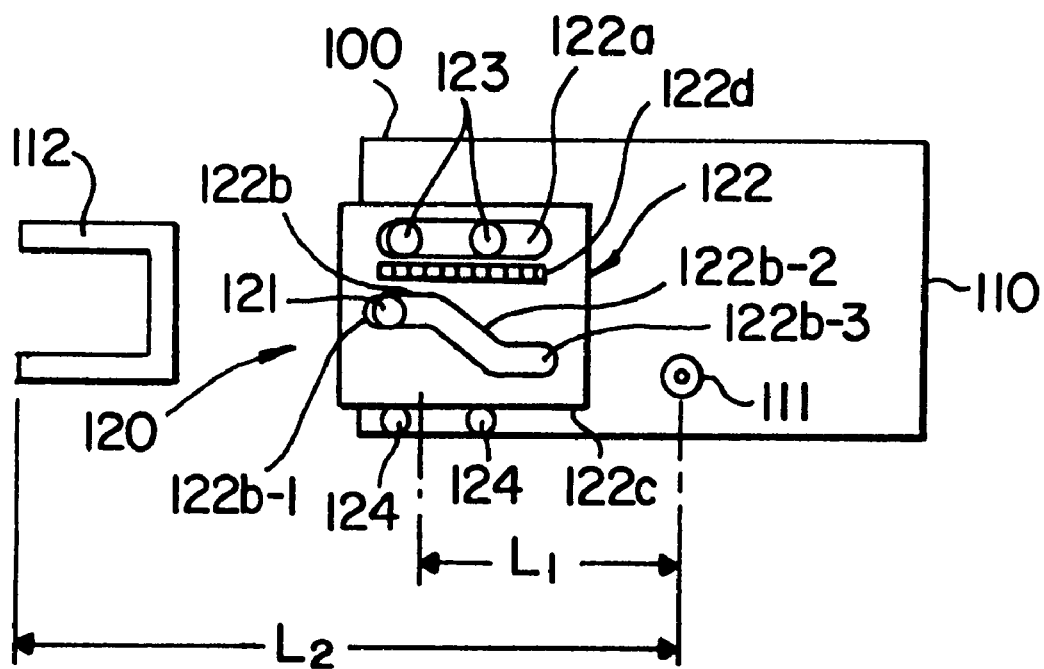
FIG. 23 is a side elevational view illustratively showing a tilt mechanism of a prior cartridge transferring robot (accessor) for a library apparatus.

FIGS. 22A and 22B are side elevational views showing a tilt mechanism of an accessor according to a fourth embodiment of the present invention, and FIG. 22A shows a state where a picker section is positioned horizontally and FIG. 22B illustrates a state where the picker section is in a tilt condition.

As shown in FIGS. 22A and 22B, a tilt mechanism 15C in the fourth embodiment is composed of a tilt base 7f similar to that of the first embodiment and a swinging drive mechanism 16C. The reference numerals being the same as those in the above description stand for the same or substantially same parts, and the detailed description thereof will be omitted for simplicity.

The swinging drive mechanism 16C in the fourth embodiment comprises a cam follower 29C, a guide member 68, a link mechanism 69 and a rotating drive mechanism 17C.

The cam follower 29C is made to laterally protrude from the rear side surface of a picker section 7g as well as the cam follower 29 in the first embodiment.

The guide member 68 is fixedly secured to the tilt base 7f, and this guide member 68 includes an elongated guide hole 68a formed along the circumference defined about the supporting shaft 30a to have a width equal to the diameter of the cam follower 29C. Further, the cam follower 29C on the picker section 7g side engages with the elongated guide hole 68a so that the cam follower 29C is guided around a supporting shaft 30a through the elongated guide hole 68a.

The link mechanism 69 is made up of two link members 69a, 69b. The proximal side link member 69a is pivotally fitted to a side surface lower portion of a rear section of the tilt base 7f to be swingable around a rotary shaft (pivot) 69c. Further, the proximal end portion of the link member 69b is pivotally fitted to the tip portion of the link member 69a to be swingable around a rotary shaft 69*d*. In addition, the tip portion of the link member 69*b* is pivotally attached to the cam follower 29C.

The rotating drive mechanism 17C acts as to rotate the proximal side of the link mechanism 69 around its rotary shaft 69*c*, and as shown in FIGS. 22A and 22B, is made up of a sectorial gear portion 69*e* formed on the proximal side of the link member 69*a*, a gear 70 engaging with the sectorial gear portion 69*e*, and a tilt motor (not shown) for rotationally driving the gear 70.

Accordingly, when the gear 70 is rotationally driven by the tilt motor (not shown), the link member 69*a* is rotationally driven around the rotary shaft 69*c* through the sectorial gear portion 69*e* gearing with the gear 70. In addition, the cam follower 29C is driven to reciprocate vertically along the elongated guide hole 68*a* while the link member 69*b* rotates with respect to the rotary shaft 69*d* and the cam follower 29C.

In the tilt mechanism 15C of the accessor 7 according to the fourth embodiment thus arranged, in a manner that the cam follower 29C is driven vertically through the link mechanism 69 by means of the rotating drive mechanism 17C, in a state where the cam follower 29C is positioned at a low-level portion 68*a*-1 of the elongated guide hole 68*a* as shown in FIG. 22A, the picker section 7*g* is placed to take the horizontal condition, thus horizontally maintaining the cartridge inserting/extracting direction of the hand mechanism 7*d*.

On the other hand, if the cam follower 29C is shifted upwardly through the link mechanism 69 by means of the rotating drive mechanism 17C to be positioned at a high-level portion 68*a*-2 of the elongated guide hole 68*a* as shown in FIG. 22B, the picker section 7*g* swings around the supporting shaft 30*a* to come into the tilt condition, so that the cartridge inserting/extracting direction of the hand mechanism 7*d* is maintained to be inclined downwardly by a given angle (for example 12°) with respect to the horizontal direction.

Whereupon, through the swinging drive mechanism 16C disposed on the rear side of the picker section 7*g*, the picker section 7*g* is swingingly driven around the supporting shaft 30*a* set on the picker section front side, thereby adjusting the angle of the cartridge inserting/extracting direction with respect to the horizontal plane, which can offer the same effects as those of the above-described first embodiment.

[7] Others

Although in the above-described embodiments the cartridge inserting/extracting direction can take two different directions: the horizontal direction (0°) and the direction looking downward by a given angle (for example, 12°) with respect to the horizontal direction, this invention is not limited to these directions but is applicable, as in the case of the above-described embodiments, to, for example, the case that the cartridge inserting/extracting direction assumes three different directions or the case that the cartridge inserting and extracting directions are set in a stepless condition, and these cases can offer the same effects as those of the above-described embodiments.

It should be understood that the present invention is not limited to the above-described embodiments, and that it is intended to cover all changes and modifications of the embodiments of the invention herein used for the purpose of the disclosure, which do not constitute departures from the spirit and scope of the invention.

What is claimed is:

1. A cartridge transferring robot for use in a library apparatus including a storage unit for storing a number of cartridges, each cartridge accommodating a storage medium, a cartridge entry/exit station through which an individual cartridge of the number of cartridges is inserted into or removed from the library apparatus, and a read/write unit for performing reading from or writing to the storage medium of the individual cartridge, the robot being disposed in the library apparatus for transferring a selected cartridge of the number of cartridges between the storage unit, the cartridge entry/exit station and the read/write unit, the robot comprising:

a picker section having first and second opposing ends, movable along a traveling path between the storage unit, the cartridge entry/exit station and the read/write unit, said picker section including a hand mechanism that is supported by said picker section at a position toward said first end thereof for gripping the selected cartridge, and said hand mechanism being selectively operable for projecting from said picker section toward a selected one of the storage unit, the cartridge entry/exit station and the read/write unit, and for retracting back into said picker section and away from said selected one of the storage unit, the cartridge entry/exit station and the read/write unit;

a moving mechanism, operatively connected to said picker section, for moving said picker section to a selected one of three positions respectively confronting the storage unit, the cartridge entry/exit station and the read/write unit; and a tilt mechanism for changing an angle at which the selected cartridge is to be inserted into and drawn from said selected one of the storage unit, the cartridge entry/exit station and the read/write unit, depending on where the selected cartridge is to be inserted into and drawn from, with respect to a horizontal plane, said tilt mechanism including:

a tilt base supported by said moving mechanism and having a fixed fulcrum pivot by which said picker section is pivotally mounted on said tilt base, said fixed fulcrum point being positioned on a side of said first end of said picker section nearest said hand mechanism, and a swinging drive mechanism supported by said tilt base and including:

a cam follower fixedly mounted on said picker section at a position on said second end of said picker section opposite to said first end nearest said hand mechanism with respect to said fulcrum pivot, and section urging means operatively connected with said cam follower for urging said picker section to move angularly with respect to said tilt base about said fulcrum pivot.

2. A cartridge transferring robot for a library apparatus as defined in claim 1, wherein said cam follower is positioned at a side surface of said picker section;

said section urging means further including:

a plate cam slidably connected with said tilt base so as to be movable in the cartridge inserting/extracting direction with respect to said tilt base and also slidably connected to said cam follower so as to guide said cam follower vertically in accordance with the movement of said plate cam, and a drive mechanism, operatively connected with said plate cam, for moving said plate cam in the cartridge inserting/extracting direction with respect to said tilt base.

3. A cartridge transferring robot for a library apparatus as defined in claim 1, wherein said cam follower is positioned at a rear surface of said picker section;
said section urging means further including:
a block cam slidably connected with said tilt base so as to be movable in a direction perpendicular to the cartridge inserting/extracting direction with respect to said tilt base and also slidably connected to said cam follower so as to guide said cam follower vertically, in accordance with the movement of said block cam, and
a drive mechanism, operatively connected with said block cam, for moving said block cam in a direction perpendicular to the cartridge inserting/extracting direction with respect to said tilt base.

4. A cartridge transferring robot for a library apparatus as defined in claim 1,
wherein said cam follower is positioned at a rear surface of said picker section;
said section urging means further including:
a cylindrical cam pivotally connected with said tilt base so a to be rotatable around a vertical axis with respect to said tile base and slidably connected to said cam follower so as to guide said cam follower vertically in accordance with a rotational movement of said cylindrical cam; and
a rotating drive mechanism, operatively connected with said cylindrical cam, for rotating said cylindrical cam around said vertical axis with respect to said tilt base.

5. A cartridge transferring robot for a library apparatus as defined in claim 1,
wherein said cam follower is positioned at a side surface of said picker section;
said section urging means further including:
a guide member fixedly mounted on said tilt base and slidably connected to said cam follower so as to guide said cam follower around said fulcrum pivot;
a link mechanism having a hinge in the middle thereof, whose tip side is pivotally connected to said cam follower and whose proximal side is pivotally connected to said tilt base so as to guide said cam follower vertically in accordance with the stretching movement of said link mechanism; and a drive mechanism, operatively connected with said link mechanism, for stretching said link mechanism.

6. A cartridge transferring robot for a library apparatus as defined in claim 1, wherein said swinging drive mechanism includes:
a cam follower provided on a rear side surface of said picker section;
a plate cam provided to be movable in the cartridge inserting/extracting direction with respect to said tilt base for guiding said cam follower vertically in accordance with movement of said cam follower in forward and backward directions; and
a drive mechanism for moving said plate cam in the cartridge inserting/extracting direction with respect to said tilt base.

7. A cartridge transferring robot for a library apparatus as defined in claim 1, wherein said swinging drive mechanism includes:
a cam follower provided on a rear surface of said picker section;
a block cam provided to be movable in a direction perpendicular to the cartridge inserting/extracting direction with respect to said tilt base for guiding said cam follower vertically; and
a drive mechanism for moving said block cam in a direction perpendicular to the cartridge inserting/extracting direction with respect to said tilt base.

8. A cartridge transferring robot for a library apparatus as defined in claim 1, wherein said swinging drive mechanism includes:
a cam follower provided in a rear side of said picker section;
a cylindrical cam provided to be rotatable around a vertical axis with respect to said tilt base for guiding said cam follower vertically in accordance with a rotational movement of said cylindrical cam; and
a rotating drive mechanism for rotating said cylindrical cam around said vertical axis with respect to said tilt base.

9. A cartridge transferring robot for a library apparatus as defined in claim 1, wherein said swinging drive mechanism includes:
a cam follower provided on a rear side surface of said picker section;
a guide member fixed to said tilt base for guiding said cam follower around said supporting shaft;
a link mechanism whose tip side is pivotally fitted to said cam follower and whose proximal side is pivotally fitted to said tilt base; and
a rotating drive mechanism for rotating said proximal side of said link mechanism around a pivot.

10. A cartridge transferring robot as defined in claim 1, wherein said projecting portion of said hand mechanism, said fixed fulcrum pivot and said cam follower are positioned in order from said first end of said picker section, which faces said selected one of the storage unit, the cartridge entry/exit station and the read/write unit, to said second end of said picker section.

11. A cartridge transferring robot for use in a library apparatus including at least a storage unit for storing a cartridge accommodating a storage medium, a cartridge entry/exit station for conducting entry/exit of said cartridge and a drive unit for carrying out access to said storage medium within said cartridge, said cartridge transferring robot comprising:
a picker section having first and second opposing ends, and including a hand mechanism for gripping said cartridge for insertion and extraction of said cartridge;
a moving mechanism for moving said picker section to a given position; and
a tilt mechanism for adjusting an angle of the cartridge inserting/extracting direction with respect to a horizontal plane, to transfer said cartridge within said library apparatus, said tilt mechanism including:
a tilt base supported by said moving mechanism and having a fixed fulcrum pivot by which said picker section is pivotally mounted on said tilt base, said fixed fulcrum point being positioned on said first end of picker section nearest said hand mechanism; and
a swinging drive mechanism disposed on said second end of said picker section opposite said first end.

12. The cartridge transferring robot for a library apparatus as defined in claim 11, wherein said fixed fulcrum pivot is located on a surface of said picker section facing said hand mechanism and disposed on said picker section first end, and wherein said swinging drive mechanism is disposed along a surface on said picker section second end and facing away from said hand mechanism.

* * * * *